(12) United States Patent
Lee

(10) Patent No.: US 11,662,636 B2
(45) Date of Patent: May 30, 2023

(54) DISPLAY DEVICE

(71) Applicant: Samsung Display Co., Ltd., Yongin-Si (KR)

(72) Inventor: Yong Hee Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/235,835

(22) Filed: Apr. 20, 2021

(65) Prior Publication Data

US 2021/0325715 A1 Oct. 21, 2021

(30) Foreign Application Priority Data

Apr. 20, 2020 (KR) .................. 10-2020-0047628

(51) Int. Cl.
*G02F 1/1362* (2006.01)
*G02F 1/1343* (2006.01)
*G02F 1/1368* (2006.01)

(52) U.S. Cl.
CPC ........ *G02F 1/13624* (2013.01); *G02F 1/1368* (2013.01); *G02F 1/134345* (2021.01); *G02F 1/136286* (2013.01); *G02F 1/136222* (2021.01); *G02F 1/136227* (2013.01)

(58) Field of Classification Search
CPC .................................................. G02F 1/13624
See application file for complete search history.

(56) References Cited

U.S. PATENT DOCUMENTS

| | | | | |
|---|---|---|---|---|
| 11,422,421 B2* | 8/2022 | Jeon | .................. | G02F 1/136286 |
| 2008/0074572 A1* | 3/2008 | Kim | ...................... | H01L 27/124 |
| | | | | 257/E21.414 |
| 2010/0123842 A1* | 5/2010 | Lee | ..................... | G02F 1/13624 |
| | | | | 349/39 |
| 2016/0155393 A1* | 6/2016 | Jung | ................. | G02F 1/136213 |
| | | | | 257/71 |
| 2017/0108723 A1* | 4/2017 | No | ...................... | G02F 1/133345 |
| 2017/0301702 A1* | 10/2017 | Kim | .................. | H01L 29/78696 |
| 2020/0064663 A1* | 2/2020 | Ra | ........................ | H01L 27/1255 |
| 2020/0103688 A1* | 4/2020 | Lee | .................. | G02F 1/136227 |
| 2020/0363689 A1* | 11/2020 | Jeon | ...................... | G02F 1/1362 |

FOREIGN PATENT DOCUMENTS

| KR | 10-1675372 B1 | 11/2016 |
|---|---|---|
| KR | 2017-0118997 A | 10/2017 |

* cited by examiner

*Primary Examiner* — Sang V Nguyen
(74) *Attorney, Agent, or Firm* — Innovation Counsel LLP

(57) ABSTRACT

A display device includes a display panel including pixels, each including first, second, and third color pixels; a gate driver and a data driver connected to the pixel through a scan line and a data line, respectively. Each of the first, second, and third color pixels includes a color pixel electrode and a first transistor having a first electrode connected to the data line, a second electrode connected to the color pixel electrode, and a gate electrode connected to the scan line. A voltage distribution line is disposed to overlap the color pixel electrode of the third color pixel in a thickness direction extending in the second direction. A width of the second electrode of the first transistor of the third color pixel is greater than a width of that of each of the first and second color pixels in the first direction.

17 Claims, 19 Drawing Sheets

DISPLAY DEVICE

CROSS-REFERENCE TO RELATED APPLICATION

This application claims priority to and benefits from under 35 U.S.C. 119 Korean Patent Application No. 10-2020-0047628 filed on Apr. 20, 2020 in the Korean Intellectual Property Office, the disclosure of which is herein incorporated by reference in its entirety.

BACKGROUND

1. Technical Field

The present disclosure relates to a display device. More specifically, the present disclosure relates to a display device capable of reducing a variation in a kickback voltage between sub-pixels.

2. Description of the Related Art

The popularity of display devices has steadily increased with the development of multimedia technology. Various types of display devices such as a liquid crystal display (LCD), an organic light emitting display (OLED), and the like have been developed and are being widely used.

The LCD device that is one of the most widely-used flat panel displays typically includes two substrates on which field-generating electrodes such as a pixel electrode and a common electrode are formed and a liquid crystal layer that is interposed between the two substrates. The LCD device forms an electric field in the liquid crystal layer by applying a voltage to the field-generating electrodes to determine orientation of liquid crystal molecules in the liquid crystal layer, and controls polarization of light incident thereupon, thereby displaying an image.

The LCD device may include a thin film transistor that is connected to a pixel electrode to drive the corresponding pixel according to the capacitive voltage stored by a capacitor of the pixel.

SUMMARY

The present disclosure provides a display device capable of reducing a variation in a kickback voltage between sub-pixels (e.g., red, green, and blue sub-pixels).

However, the present disclosure are not restricted to the one set forth herein. The inventive concepts of the present disclosure will become more apparent to one of ordinary skill in the art to which the present disclosure pertains by referencing the detailed description of the present disclosure given below.

According to an embodiment, a display device includes a display panel including a plurality of pixels, a pixel of the plurality of pixels including a first color pixel, a second color pixel, and a third color pixel; a gate driver connected to the pixel through a scan line extending in a first direction; and a data driver connected to the pixel through a data line extending in a second direction that intersects the first direction. Each of the first color pixel, the second color pixel, and the third color pixel includes a color pixel electrode and a first transistor having a first electrode connected to the data line, a second electrode connected to the color pixel electrode, and a gate electrode connected to the scan line. The display device further includes a voltage distribution line that is disposed to overlap the color pixel electrode of the third color pixel in a thickness direction of the display device, extends in the second direction. A first width of the second electrode of the first transistor of the third color pixel in the first direction is greater than a second width of the second electrode of the first transistor of each of the first color pixel and the second color pixel in the first direction.

The first width may be at least 10% larger than the second width.

The first color pixel may be a red pixel, the second color pixel may be a green pixel, and the third color pixel may be a blue pixel.

Each of the first color pixel, the second color pixel, and the third color pixel may further include a second transistor having a first electrode connected to the data line and a second electrode connected to the color pixel electrode.

The display panel may further include a storage line extending in the first direction, and the first electrode of the second transistor of the first color pixel, the second color pixel, and the third color pixel may be electrically connected to the storage line.

A pixel bridge pattern may be further disposed in each of the first color pixel, the second color pixel, and the third color pixel, and the first electrode of the second transistor in each of the first color pixel, the second color pixel, and the third color pixel may be electrically connected to the storage line through the pixel bridge pattern.

Each of the first color pixel, the second color pixel, and the third color pixel may include a first sub-pixel portion and a second sub-pixel portion, and the first sub-pixel portion and the second sub-pixel portion may be spaced apart from each other with the scan line and the storage line interposed therebetween.

The display panel may further include a first sub-pixel electrode disposed in the first sub-pixel portion, and a second sub-pixel electrode disposed in the second sub-pixel portion, and a first planar size of the first sub-pixel electrode may be larger than a second planar size of the second sub-pixel electrode.

Each of the first color pixel, and the second color pixel, and the third color pixel may further include a third transistor having a first electrode connected to the voltage distribution line and a second electrode connected to the first sub-pixel electrode, and the second electrode of the first transistor may be connected to the second sub-pixel electrode.

The display panel may further include a first substrate, a second substrate facing the first substrate, and a liquid crystal layer disposed between the first substrate and the second substrate. The plurality of pixels may be disposed between the first substrate and the liquid crystal layer, and the display panel may further include a common electrode disposed between the second substrate and the liquid crystal layer. Each of the first sub-pixel electrode and the second sub-pixel electrode of the first color pixel, the second color pixel, and the third color pixel may be configured to form a liquid crystal capacitor in conjunction with the common electrode. A first liquid crystal capacitance of the first sub-pixel electrode that is formed in conjunction with the common electrode may be smaller than a second liquid crystal capacitance of the second sub-pixel electrode that is formed in conjunction with the common electrode.

The second electrode of the second transistor may be connected to the second electrode of the third transistor.

The first sub-pixel electrode of the first color pixel, the second color pixel, and the third color pixel may be configured to form a storage capacitor in conjunction with the storage line, and the first sub-pixel electrode of the third color pixel may be disposed to overlap the voltage distribution line to further form a storage parasitic capacitor.

The second electrode of the first transistor of each of the first color pixel, and the second color pixel, and the third color pixel may be disposed to overlap the scan line to form a gate-drain capacitor, and a first gate-drain capacitance formed between the scan line and the second electrode of the first transistor of the third color pixel may be greater than a second gate-drain capacitance formed between the scan line and the second electrode of the first transistor of each of the first color pixel and the second color pixel.

Each of the first color pixel, the second color pixel, and the third color pixel may further include a third transistor. The first electrode of the second transistor may be connected to the data line, and the second electrode of the second transistor may be connected to the first sub-pixel electrode. The second electrode of the third transistor may be connected to the second electrode of the second transistor, and the second electrode of the first transistor may be connected to the second sub-pixel electrode.

According to another embodiment, a display device includes a display panel including a plurality of pixels, a pixel of the plurality of pixels including a first color pixel, a second color pixel, and a third color pixel; a gate driver connected to the pixel through a scan line extending in a first direction; and a data driver connected to the pixel through a data line extending in a second direction that intersects the first direction. Each of the first color pixel, the second color pixel, and the third color pixel includes a color pixel electrode and a first transistor having a first electrode connected to the data line, a second electrode connected to the color pixel electrode, and a gate electrode connected to the scan line. The display device further includes a voltage distribution line that is disposed to overlap the color pixel electrode of the third color pixel in a thickness direction of the display device, extends in the second direction. A first width of the color pixel electrode of the third color pixel in the first direction is greater than a second width of the color pixel electrode of each of the first color pixel and the second color pixel in the first direction, and a third width of the second electrode of the first transistor of the third color pixel in the first direction is greater than a fourth width of the second electrode of the first transistor of each of the first color pixel and the second color pixel in the first direction.

Each of the first color pixel, the second color pixel, and the third color pixel may further include a second transistor having a first electrode connected to the data line and a second electrode connected to the color pixel electrode. The display panel may further include a storage line extending in the first direction. The first electrode of the second transistor of the first color pixel, the second color pixel, and the third color pixel may be electrically connected to the storage line.

Each of the first color pixel, the second color pixel, and the third color pixel may include a first sub-pixel portion and a second sub-pixel portion. The first sub-pixel portion and the second sub-pixel portion may be spaced apart from each other with the scan line and the storage line interposed therebetween. The display panel may include a first sub-pixel electrode disposed in the first sub-pixel portion, and a second sub-pixel electrode disposed in the second sub-pixel portion. A first planar size of the first sub-pixel electrode may be larger than a second planar size of the second sub-pixel electrode.

Each of the first color pixel, the second color pixel, and the third color pixel may further include a third transistor. A first electrode of the third transistor may be directly connected to the voltage distribution line, and a second electrode of the third transistor may be connected to the first sub-pixel electrode. The second electrode of the first transistor may be connected to the second sub-pixel electrode.

The display panel may include a first substrate, a second substrate facing the first substrate, and a liquid crystal layer disposed between the first substrate and the second substrate. The plurality of pixels may be disposed between the first substrate and the liquid crystal layer, and the display panel may further include a common electrode disposed between the second substrate and the liquid crystal layer. The first sub-pixel electrode of the first color pixel, the second color pixel, and the third color pixel may be configured to form a liquid crystal capacitor in conjunction with the common electrode. A first liquid crystal capacitance of the liquid crystal capacitor of the first sub-pixel electrode of the third color pixel that is formed in conjunction with the common electrode may be greater than a second liquid crystal capacitance of the liquid crystal capacitor of the first sub-pixel electrode of the first color pixel and the second color pixel that is in conjunction with the common electrode.

The second electrode of the first transistor of each of the first color pixel, and the second color pixel, and the third color pixel may be disposed to overlap the scan line to form a gate-drain capacitor. A first gate-drain capacitance formed between the scan line and the second electrode of the first transistor of the third color pixel may be greater than a second gate-drain capacitance formed between the scan line and the second electrode of the first transistor of each of the first color pixel and the second color pixel.

According to an embodiment, the display device is capable of reducing a variation in a kickback voltage between sub-pixels (e.g., red, green, and blue sub-pixels).

The effects of the present disclosure are not limited to the aforementioned effects, and various other effects are included in the present disclosure without deviating the scope of the present disclosure.

BRIEF DESCRIPTION OF THE DRAWINGS

The present disclosure will become more apparent by describing in detail embodiments with reference to the attached drawings, in which.

DETAILED DESCRIPTION OF THE EMBODIMENTS

Figure 1:
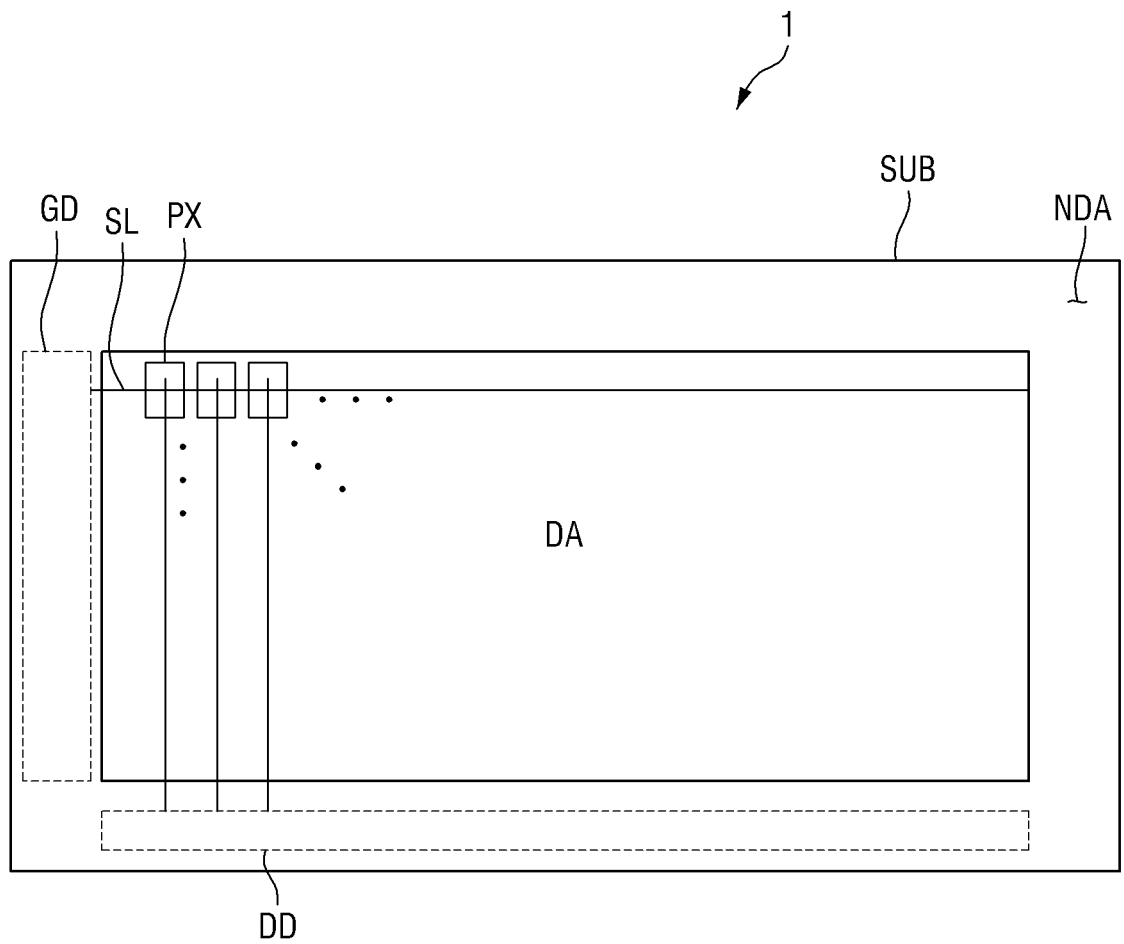
FIG. 1 is a plan view of a display device according to an embodiment.
Figure 1:
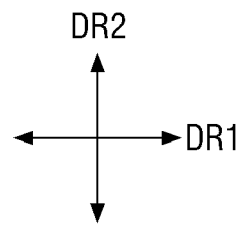
Figure 2:
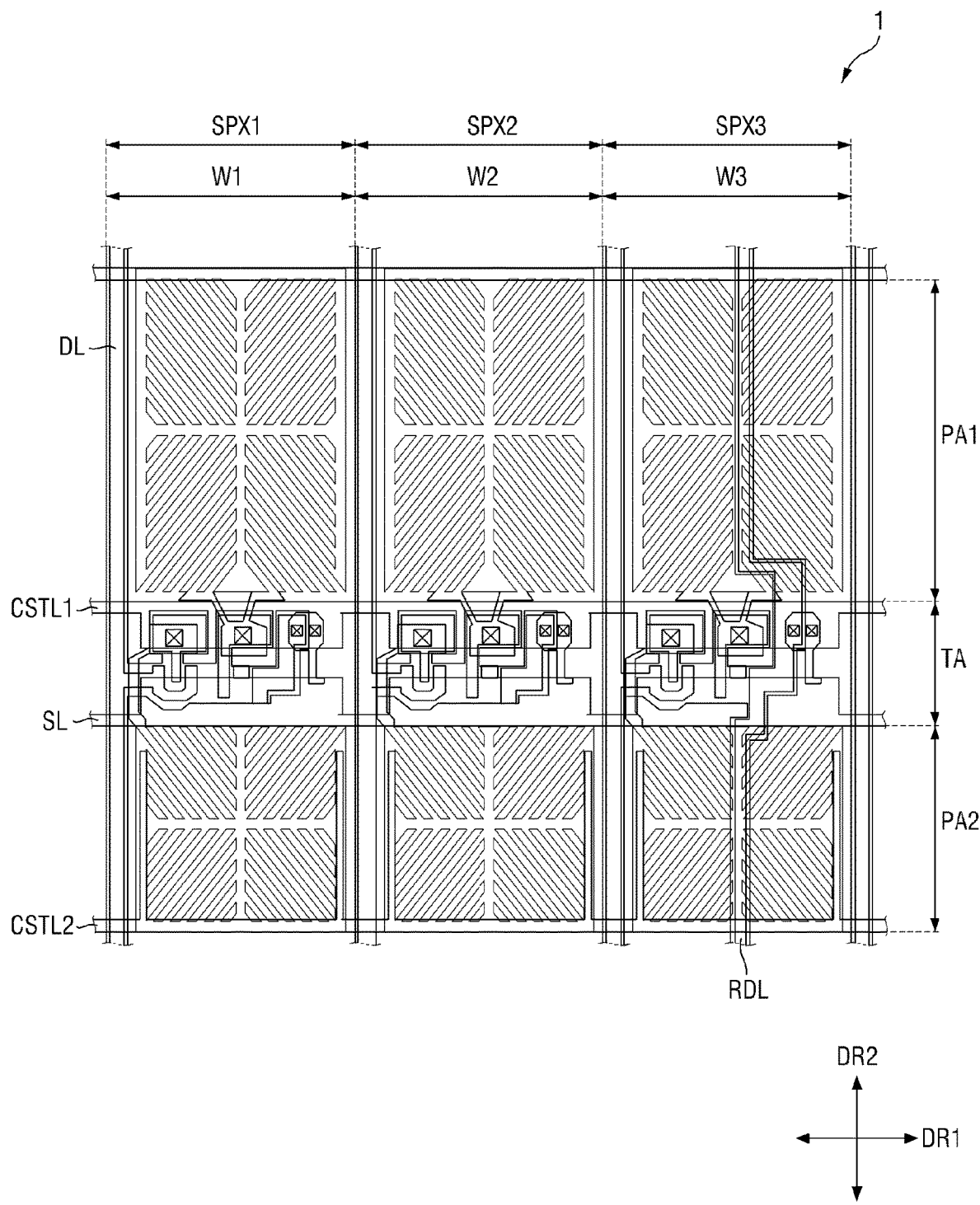
FIG. 2 is an enlarged layout diagram of a pixel of the display device shown in FIG. 1.

FIG. 1 is a plan view of a display device according to an embodiment. FIG. 2 is an enlarged layout diagram of a pixel of the display device shown in FIG. 1.

Referring to FIGS. 1 and 2, a display device 1 includes a display area DA and a non-display area NDA disposed around the display area DA. The display area DA may be disposed in a central portion of the display device 1, and the non-display area NDA may be disposed in an edge portion of the display device 1, and the edge portion may partially or entirely surround the display area DA. The display area DA may correspond to an area displaying an image, and the non-display area NDA may correspond to an area that does not display an image unlike the display area DA, but the present disclosure is not limited thereto. The display device 1 may include a gate driver GD and a data driver DD that are disposed in the non-display area NDA. The display device 1 may further include a substrate SUB. The display area DA and the non-display area NDA described above may be defined in the substrate SUB, in the same manner as in the display device 1.

A plurality of pixels PX may be disposed in the display area DA. The pixels PX may be arranged in a matrix in a first direction DR1 and a second direction DR2 that crosses the first direction DR1. The first direction DR1 and the second direction DR2 may be orthogonal to each other, but the present disclosure is not limited thereto. In the present embodiment, the first direction DR1 may refer to an extending direction of the display device 1 in a long side, and the second direction DR2 may indicate an extending direction of the display device 1 in a short side.

A pixel PX may include a plurality of color pixels. The plurality of color pixels may form the pixel PX. For example, the color pixels may correspond to a red pixel, green pixel, and blue pixel, respectively. In some embodiments, the pixel PX may further include a white pixel (not shown) in addition to the red pixel, green pixel, and blue pixel. Hereinafter, a case where the pixel PX includes three color pixels SPX1, SPX2, and SPX3 will be mainly described.

The gate driver GD applies a gate driving signal to each pixel PX in the display area DA through a scan line SL extending in the first direction DR1. In the embodiment, the gate driver GD is illustrated to be disposed adjacent to a short side of the display area DA, but the present disclosure is not limited thereto. A plurality of gate drivers GD may be disposed adjacent to more than one side of the display area DA, for example, both short sides of the display area DA, respectively. The data driver DD applies a data driving signal to each pixel PX in the display area DA through a data line DL extending in the second direction DR2. In the embodiment, the data driver DD is illustrated to be disposed adjacent to a long side (lower long side) of the display area DA.

Referring to FIGS. 1 and 2, the pixel PX may include a first color pixel SPX1, a second color pixel SPX2, and a third color pixel SPX3. In one embodiment, the first color pixel SPX1 may be a red pixel, the second color pixel SPX2 may be a green pixel, and the third color pixel SPX3 may be a blue pixel. The data line DL, the scan line SL, a first storage line CSTL1, and a second storage line CSTL2 may pass through each of the color pixels SPX1, SPX2, and SPX3. As described above, the data line DL may extend in the second direction DR2, and the scan line SL may extend in the first direction DR1. The first storage line CSTL1 may extend in the first direction DR1. The extending direction of the first storage line CSTL1 may be parallel to the extending direction of the scan line SL. The second storage line CSTL2 may include a main storage line portion extending in the first direction DR1, and a sub-storage line portion connected to the main storage line portion and extending in the second direction DR2. The second storage line CSTL2 may have two sub-storage line portions. One of the two sub-storage line portions may be disposed between the data line DL that is connected to a color pixel (e.g., the first, second, and third color pixels SPX1, SPX2, and SPX3) and a color pixel electrode of the color pixel, and the other one of the two sub-storage line portions may be disposed between the color pixel electrode of the color pixel and the data line DL that is connected to an adjacent color pixel (e.g., SPX1, SPX2, SPX3).

A plurality of data lines DL may pass through each of the first, second, and third color pixels SPX1, SPX2, and SPX3 of the pixel PX, and a color pixel (e.g., SPX1, SPX2, SPX3) that is adjacent to each of the first, second, and third color pixels SPX1, SPX2, and SPX3 in the second direction DR2, respectively.

The scan line SL and the first storage line CSTL1 may commonly pass through each of the first, second, and third color pixels SPX1, SPX2, and SPX3 of the pixel PX. That is, the scan line SL and the first storage line CSTL1 may be connected to each of the first, second, and third color pixels SPX1, SPX2, and SPX3 of the pixel PX, respectively. The main storage line portion of the second storage line CSTL2 may commonly pass through each of the first, second, and third color pixels SPX1, SPX2, and SPX3. That is, the main storage line portion of the second storage line CSTL2 may be connected to each of the first, second, and third color pixels SPX1, SPX2, and SPX3 of the pixel PX.

Each of the first, second, and third color pixels SPX1, SPX2, and SPX3 may correspond to an area between the data line DL that is connected to a color pixel and the data line DL that is connected to an adjacent color pixel in the first direction DR1, and an area between the second storage line CSTL2 of the color pixel and the second storage line CSTL2 of the adjacent color pixel in the second direction DR2.

Each of the first, second, and third color pixels SPX1, SPX2, and SPX3 may be divided into a plurality of regions. For example, a color pixel (e.g., SPX1, SPX2, SPX3) may be divided into sub-pixel portions PA1 and PA2 and a switching element region TA arranged in the second direction DR2. The first sub-pixel portion PA1 may correspond to an area between the second storage line CSTL2 of an adjacent color pixel in the second direction DR2 and the first storage line CSTL1 of the color pixel. The second sub-pixel portion PA2 may correspond to an area between the second storage line CSTL2 of the color pixel and the scan line SL of the color pixel. The switching element region TA may correspond to an area between the first sub-pixel portion PA1 and the second sub-pixel portion PA2. That is, the first sub-pixel portion PA1, the switching element region TA, and the second sub-pixel portion PA2 may be sequentially arranged in the second direction DR2. In one embodiment, the size of the first sub-pixel portion PA1 may be larger than the size of the second sub-pixel portion PA2 in a plan view. As illustrated in FIG. 2, the first sub-pixel portion PA1 and the second sub-pixel portion PA2 may have the same width in the first direction DR1, and the width of the first sub-pixel portion PA1 in the second direction DR2 may be greater than the width of the second sub-pixel portion PA2 in the second direction DR2.

A first color pixel electrode may be disposed in the first sub-pixel portion PA1 of a color pixel (e.g., SPX1, SPX2, SPX3), and a second color pixel electrode may be disposed in the second sub-pixel portion PA2 of the color pixel. The first storage line CSTL1 may be disposed between the first color pixel electrode and the second color pixel electrode, and the scan line SL may be disposed between the first storage line CSTL1 and the second color pixel electrode. The main storage line portion of the second storage line CSTL2 may be disposed between the second color pixel electrode of the color pixel and the first color pixel electrode of an adjacent color pixel in the second direction DR2. The sub-storage line portions of the second storage line CSTL2 of the color pixel may be disposed, respectively, between the data line DL of the color pixel and the second color pixel electrode of the color pixel, and between the second color pixel electrode of the color pixel and the data line DL of an adjacent color pixel in the first direction DR1.

A voltage distribution line RDL substantially extending in the second direction DR2 may pass through the third color pixel SPX3. The voltage distribution line RDL may be electrically connected to the first storage line CSTL1, and the voltage applied through the voltage distribution line RDL may be transmitted to the first storage line CSTL1. Since the first storage line CSTL1 is commonly connected to the first, second, and third color pixels SPX1, SPX2, and SPX3 of the pixel PX, the same storage voltage may be applied to the first, second, and third color pixels SPX1, SPX2, SPX3 of the pixel PX.

Meanwhile, the size of the third color pixel SPX3 may be larger than the size of the first color pixel SPX1 or the size of the second color pixel SPX2 in a plan view. In one embodiment, a width W3 of the third color pixel SPX3 in the first direction DR1 in the plan view may be larger than a width W1 of the first color pixel SPX1 and a width W2 of the second color pixel SPX2 in the first direction DR1 in the plan view. The large size of the third color pixel SPX3 may compensate for the loss of light in the first sub-pixel portion PA1 and the second sub-pixel portion PA2 of the third color pixel SPX3 due to the voltage distribution line RDL passing through the third color pixel SPX3.

Figure 3:
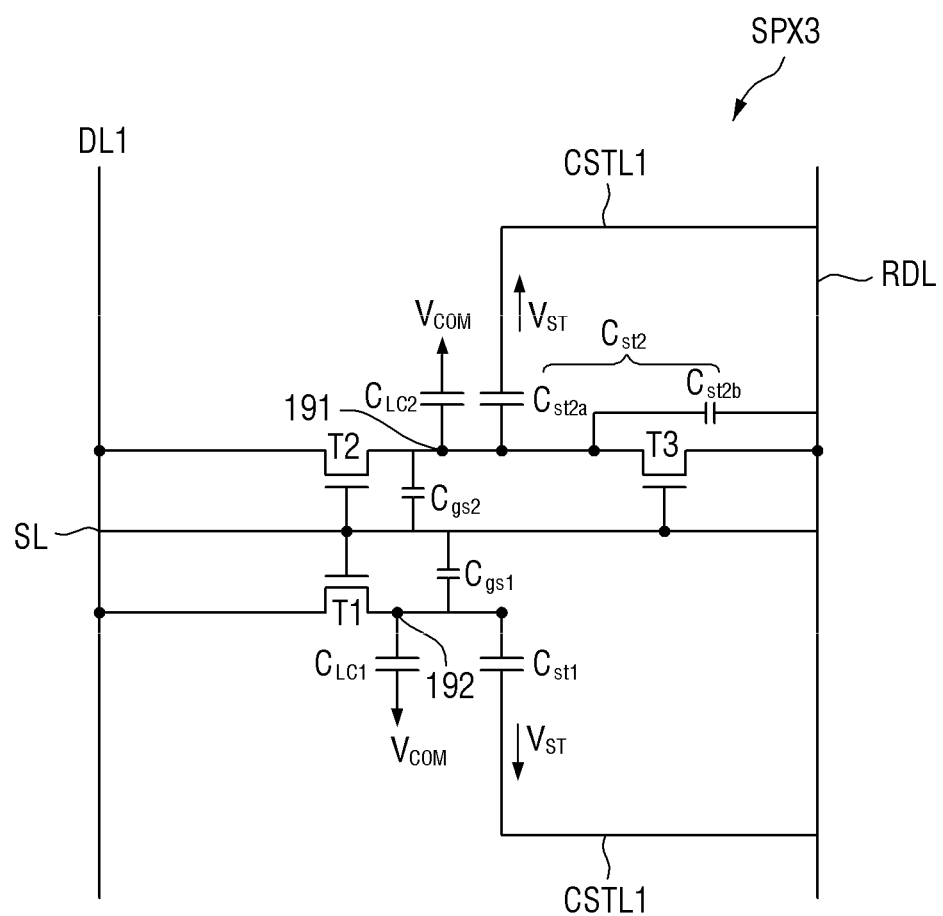
FIG. 3 is an equivalent circuit diagram of a third color pixel shown in FIG. 2.
Figure 4:
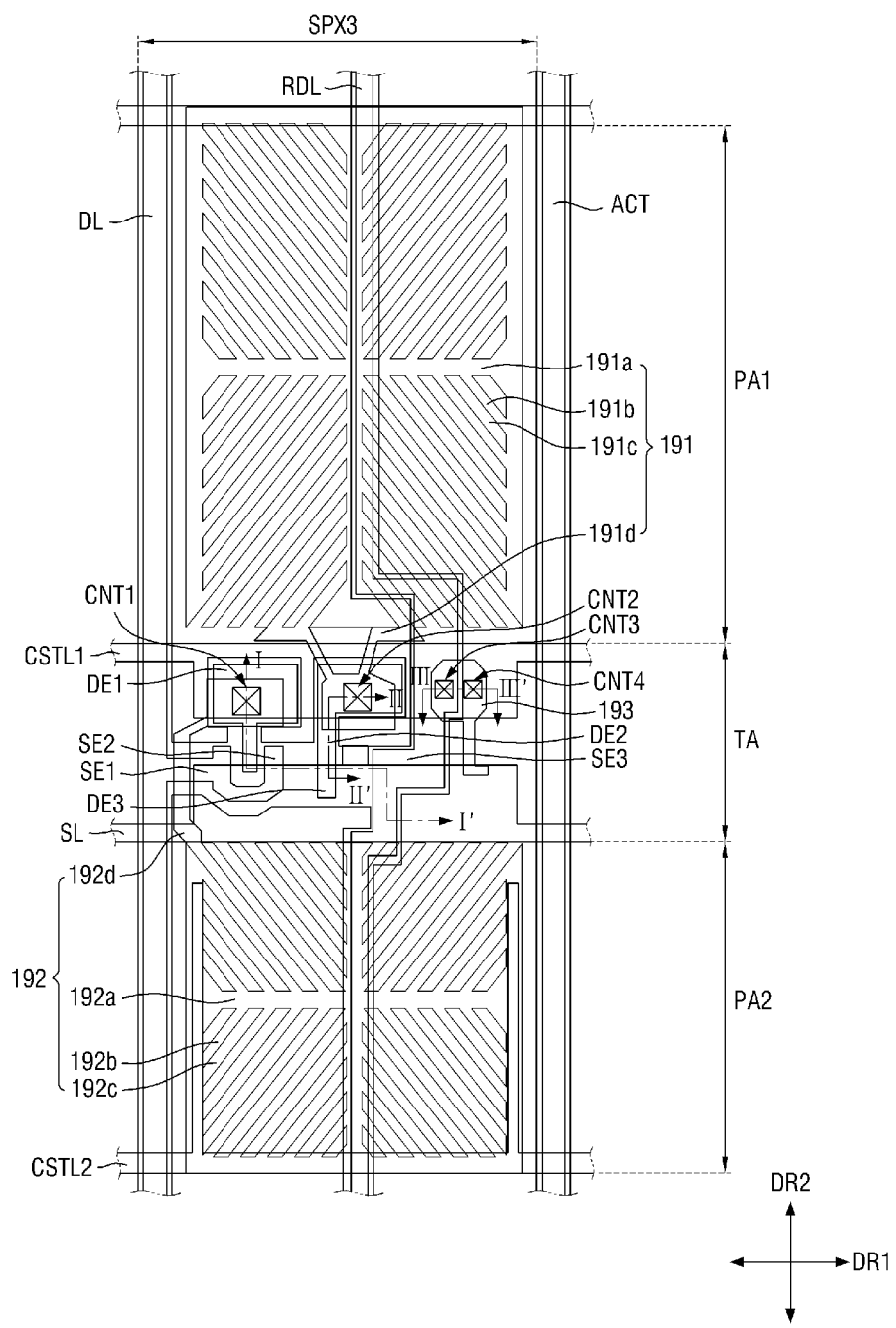
FIG. 4 is an enlarged layout diagram of the third color pixel shown in FIG. 2.
Figure 5:
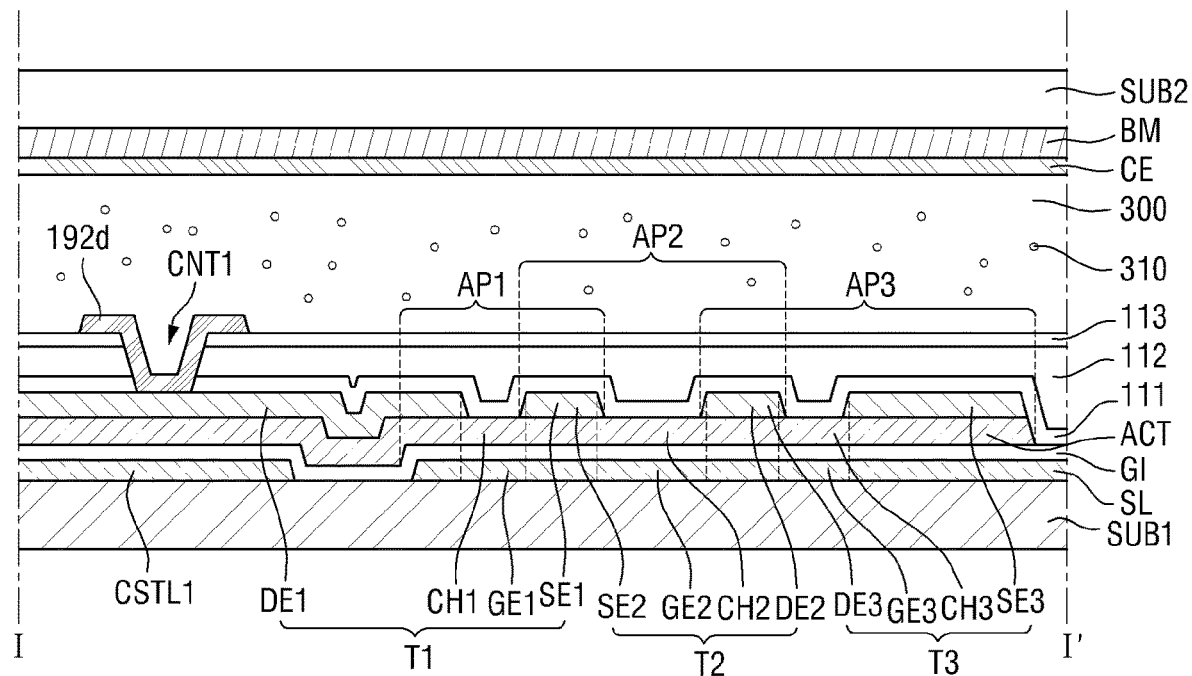
FIG. 5 is a cross-sectional view taken along line I-I' of FIG. 4.

FIG. 3 is an equivalent circuit diagram of the third color pixel SPX3 shown in FIG. 2. FIG. 4 is an enlarged layout diagram of the third color pixel SPX3 shown in FIG. 2. FIG. 5 is a cross-sectional view taken along line I-I' of FIG. 4.

Referring to FIGS. 3 to 5, the third color pixel SPX3 may include a first transistor T1, a second transistor T2, and a third transistor T3.

A first electrode of the first transistor T1 may be connected to a data line DL1, a second electrode of the first transistor T1 may be connected to a second color pixel electrode 192, and a gate electrode of the first transistor T1 may be connected to the scan line SL. A first liquid crystal capacitor CLC1 may be formed between the second color pixel electrode 192 and a common electrode CE to which a common voltage $V_{COM}$ is applied. A first storage capacitor $C_{st1}$ may be formed between the second color pixel electrode 192 and the first storage line CSTL1 to which a storage voltage $V_{ST}$ is applied.

A first electrode of the second transistor T2 may be connected to the data line DL1, the second electrode of the second transistor T2 may be connected to a first color pixel electrode 191, and a gate electrode of the second transistor T2 may be connected to the scan line SL. A second liquid crystal capacitor $C_{LC2}$ may be formed between the first color pixel electrode 191 and the common electrode CE to which the common voltage $V_{COM}$ is applied. A second-a storage capacitor $C_{st2a}$ may be formed between the first color pixel electrode 191 and the first storage line CSTL1 to which the storage voltage $V_{ST}$ is applied. Further, a second-b storage capacitor $C_{st2b}$ may be formed between the first color pixel electrode 191 and the voltage distribution line RDL to which a predetermined voltage (e.g., a voltage equal to the storage voltage $V_{ST}$) is applied. The second-a storage capacitor $C_{st2a}$ and the second-b storage capacitor $C_{st2b}$ may have a parallel relationship, and the sum of the second-a storage capacitor $C_{st2a}$ and the second-b storage capacitor $C_{st2b}$ may correspond to a second storage capacitor $C_{st2}$. The second-b storage capacitor $C_{st2b}$ formed between the voltage distribution line RDL and the first color pixel electrode 191 may be a parasitic capacitor.

A first electrode of the third transistor T3 may be connected to the voltage distribution line RDL, a second electrode of the third transistor T3 may be connected to the first color pixel electrode 191, and a gate electrode of the third transistor T3 may be connected to the scan line SL.

Meanwhile, a first gate-drain capacitor $C_{gs1}$ may be formed between the second electrode of the first transistor T1 and the gate electrode of the first transistor T1, and a second gate-drain capacitor $C_{gs2}$ may be formed between the second electrode of the second transistor T2 and the gate electrode of the second transistor T2. The first and second gate-drain capacitors $C_{gs1}$ and $C_{gs2}$ may be parasitic capacitors, respectively.

The equivalent circuit diagram of the first color pixel SPX1 or the second color pixel SPX2 is different from that of the third color pixel SPX3 in that the second electrode of the third transistor T3 is connected to the first storage line CSTL1 via the voltage distribution line RDL. Since the second electrodes of the third transistor T3 of the first color pixel SPX1 and the second color pixel SPX2 are connected to the first storage line CSTL1, the second-b storage capacitor $C_{st2b}$ between the first color pixel electrode 191 and the voltage distribution line RDL to which the predetermined voltage (equal to the storage voltage $V_{ST}$) is applied may not be formed.

Figure 6:
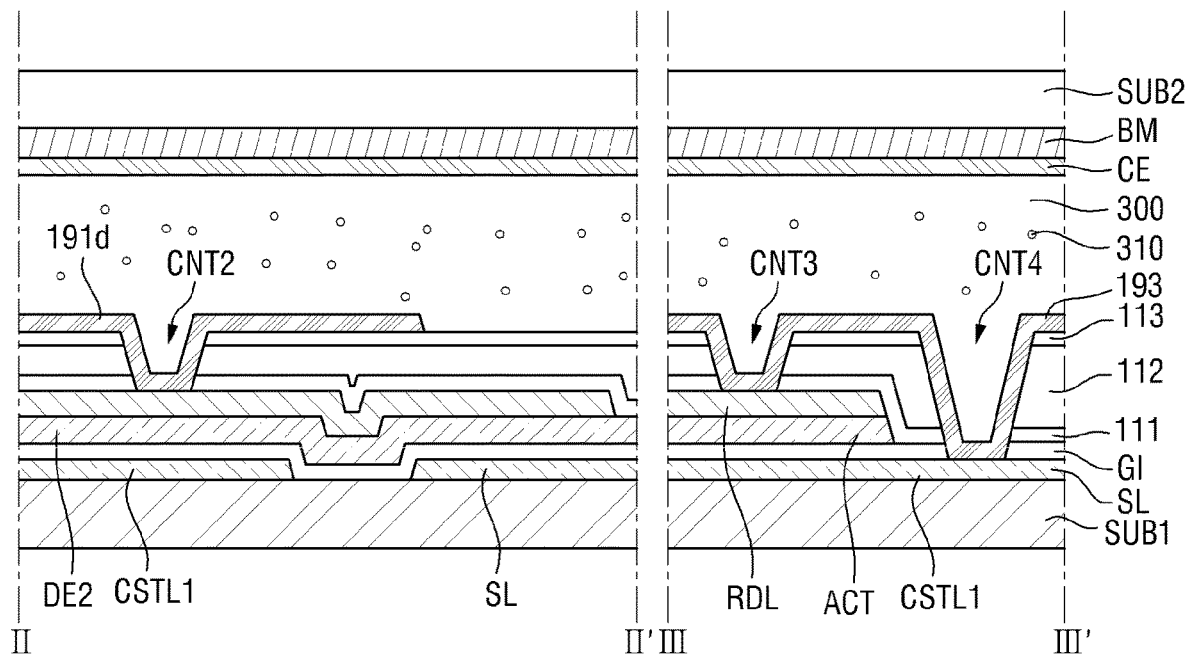
FIG. 6 is a cross-sectional view taken along lines II-IT and III-III' of FIG. 4.
Figure 7:
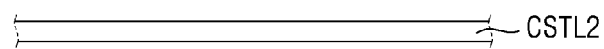
FIG. 7 is a plan view showing a first conductive layer shown in FIG. 4.
Figure 7:
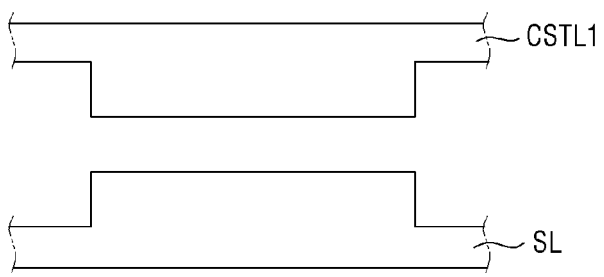
Figure 7:
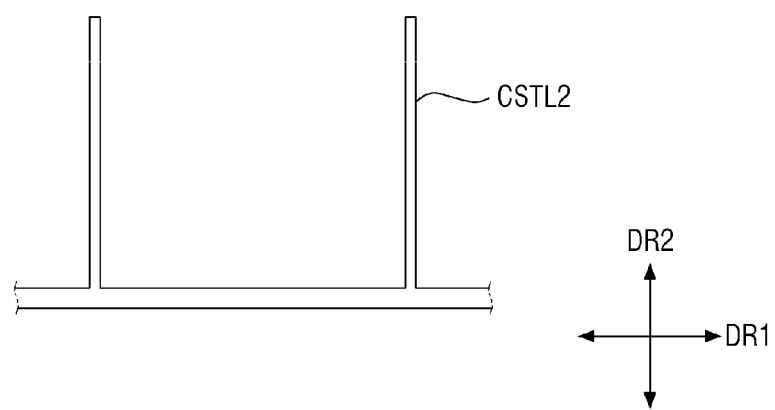
Figure 8:
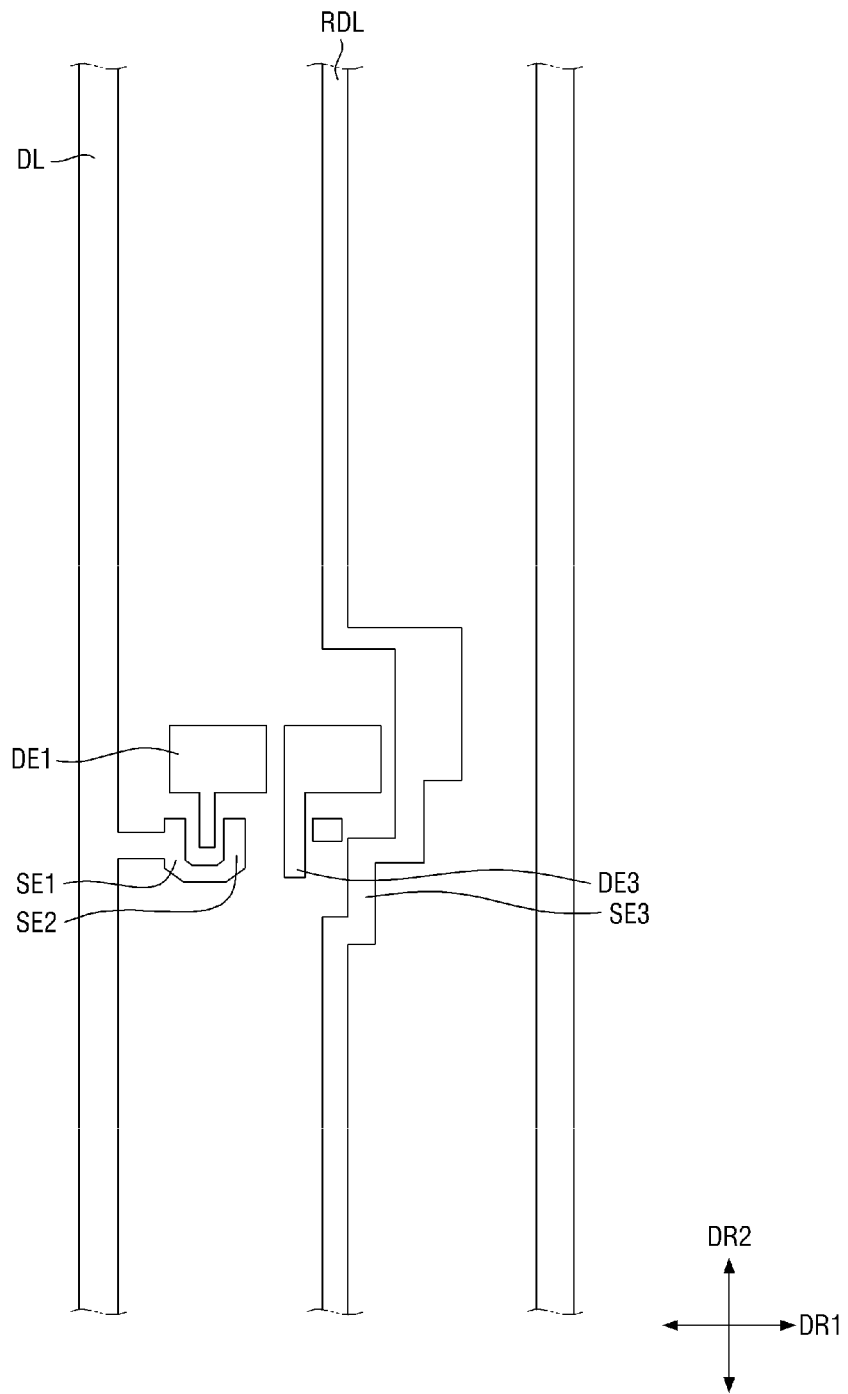
FIG. 8 is a plan view showing a second conductive layer shown in FIG. 4.
Figure 9:
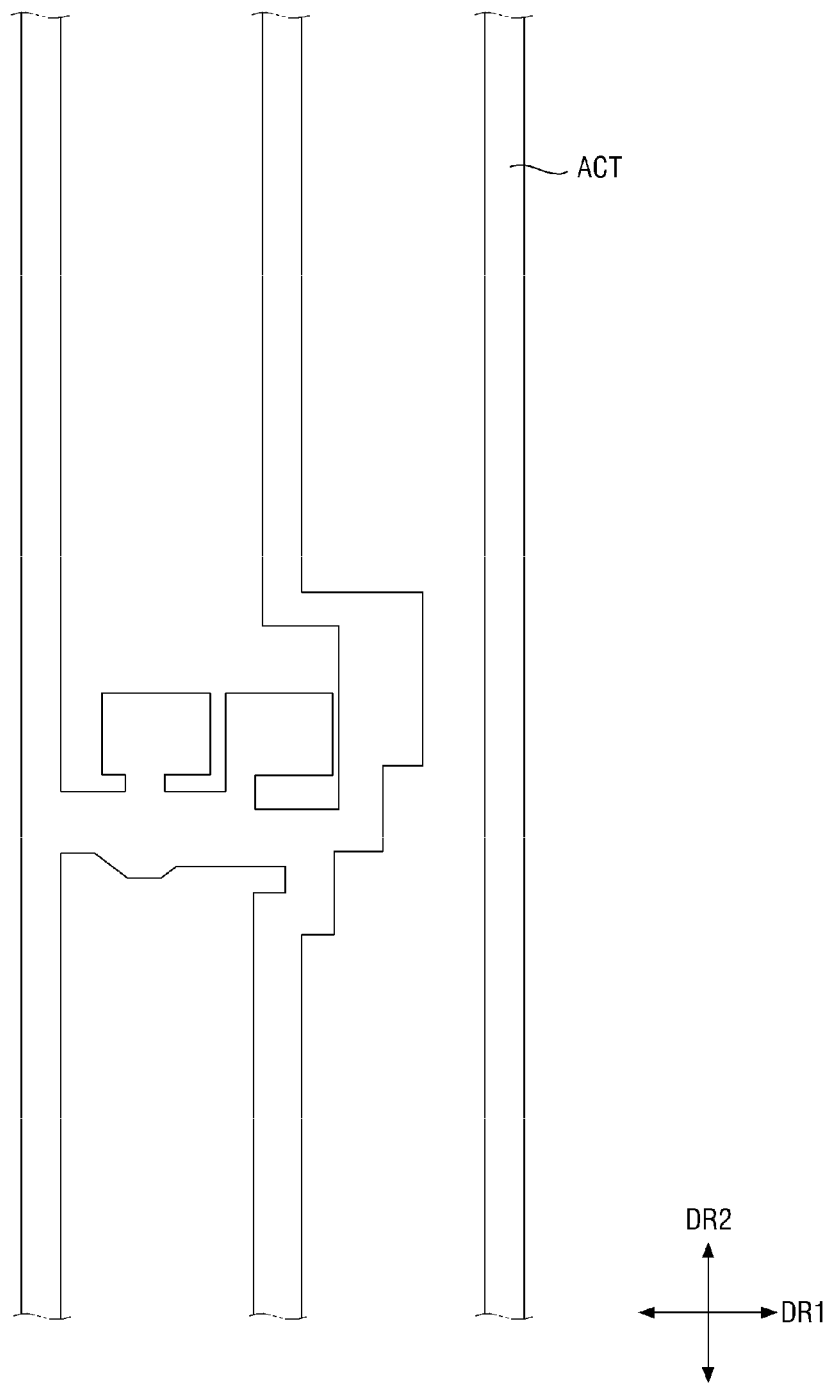
FIG. 9 is a plan view showing a semiconductor layer shown in FIG. 4.
Figure 10:
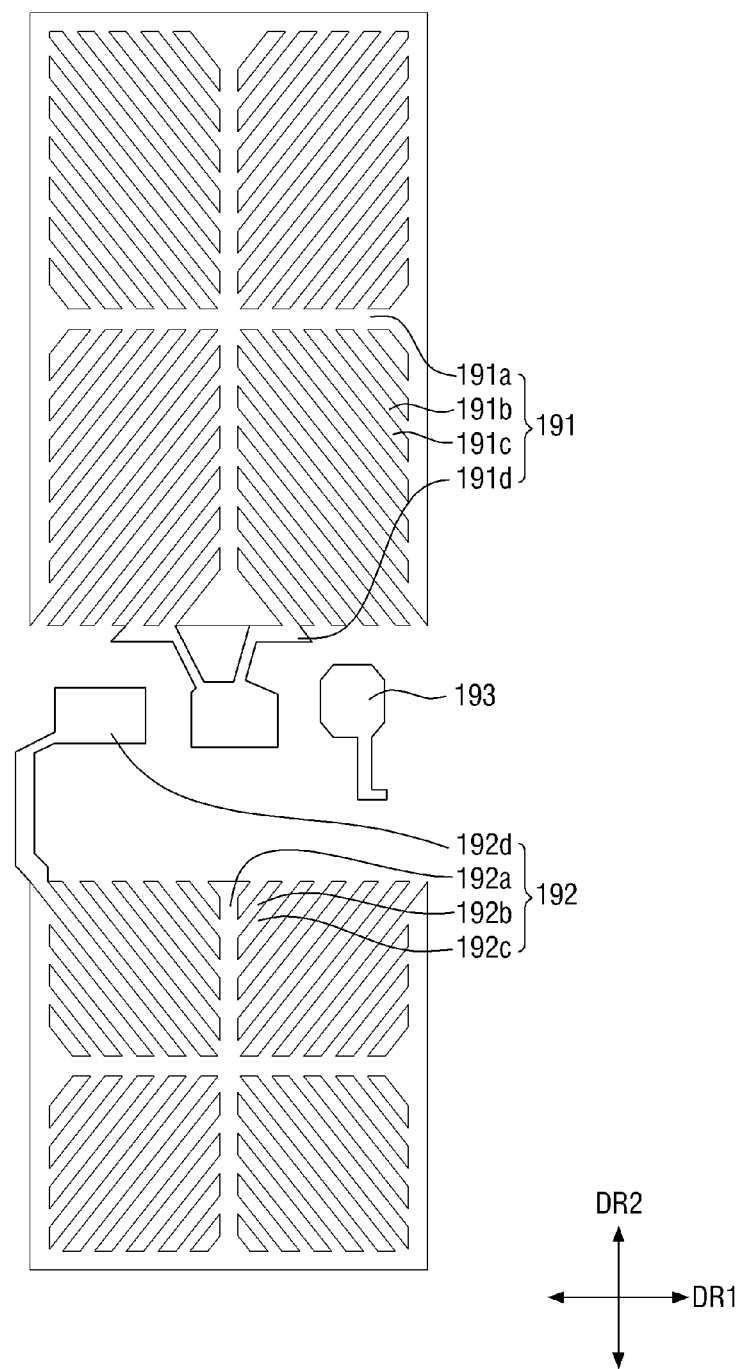
FIG. 10 is a plan view showing a third conductive layer shown in FIG. 4.
Figure 11:
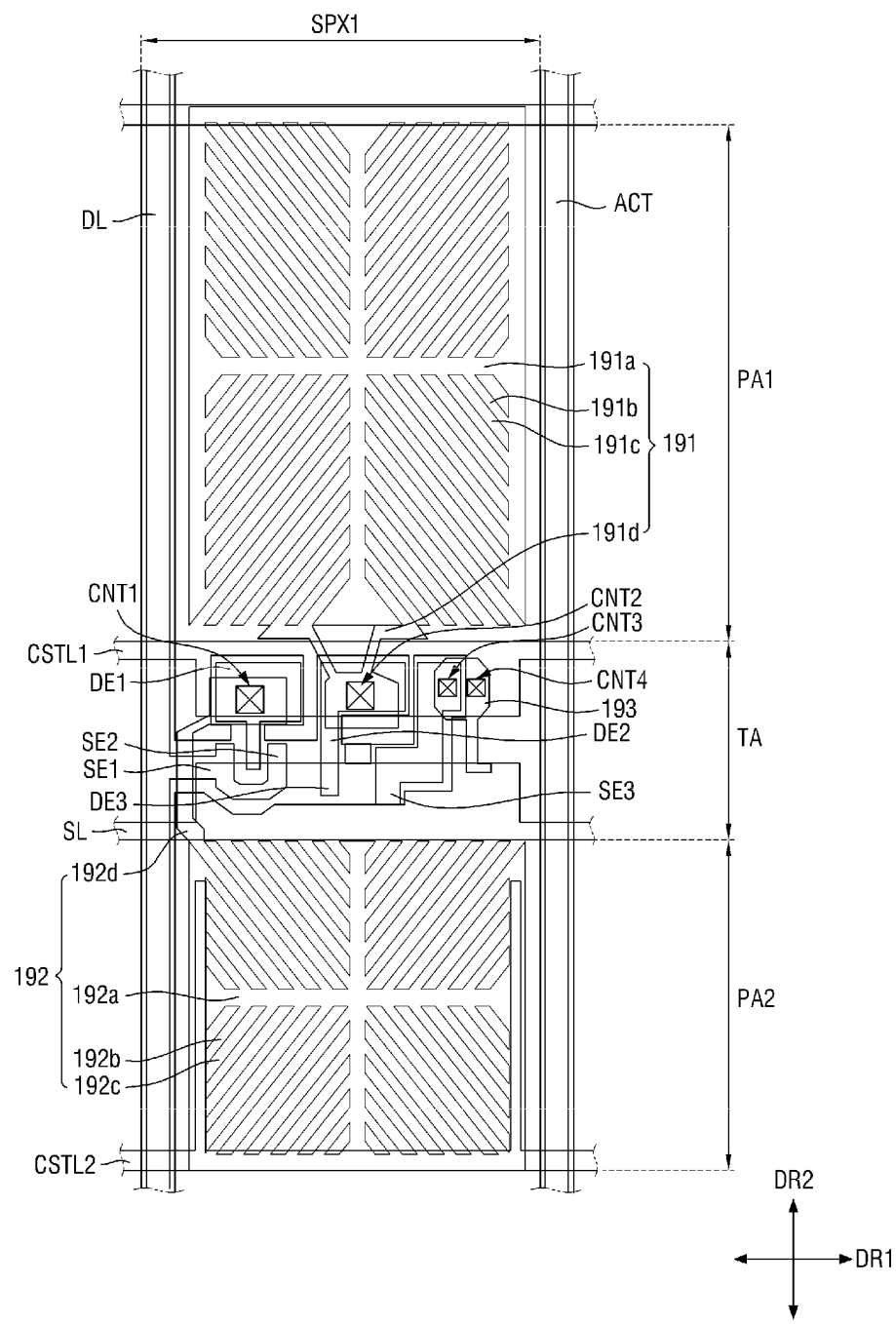
FIG. 11 is an enlarged layout diagram of a first color pixel shown in FIG. 2.
Figure 12:
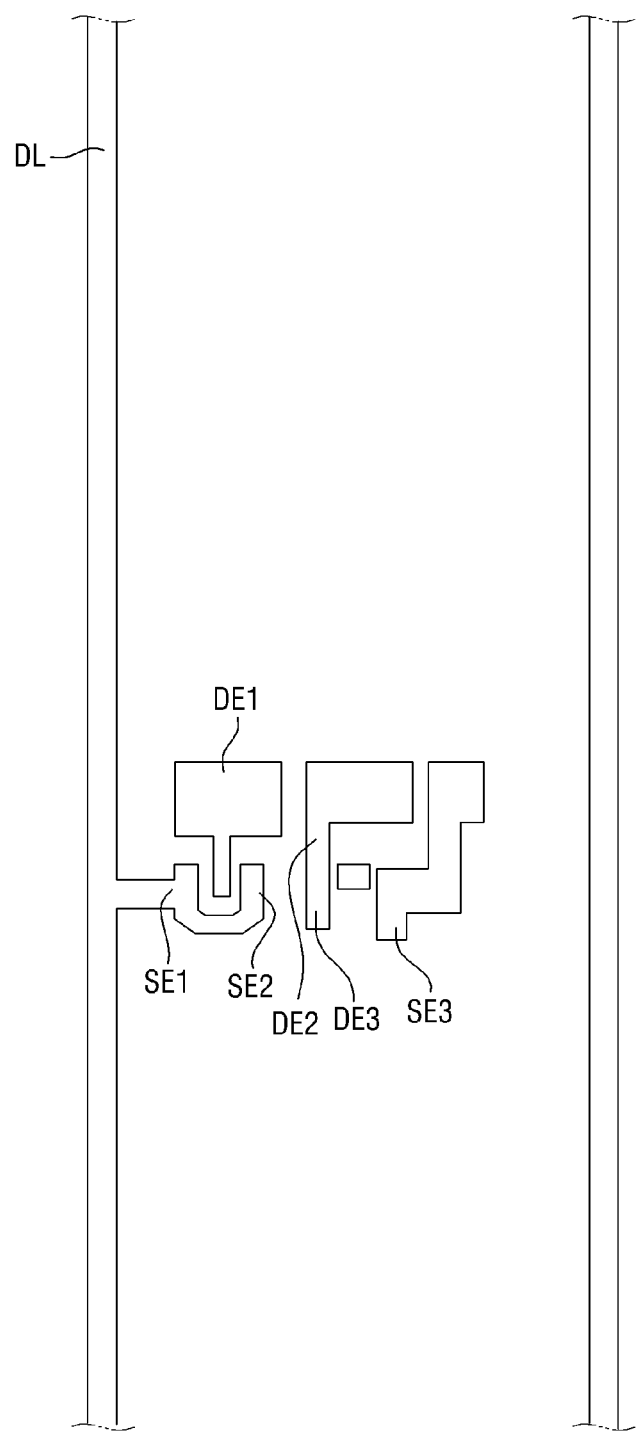
FIG. 12 is a plan view showing a second conductive layer shown in FIG. 11.
Figure 13:
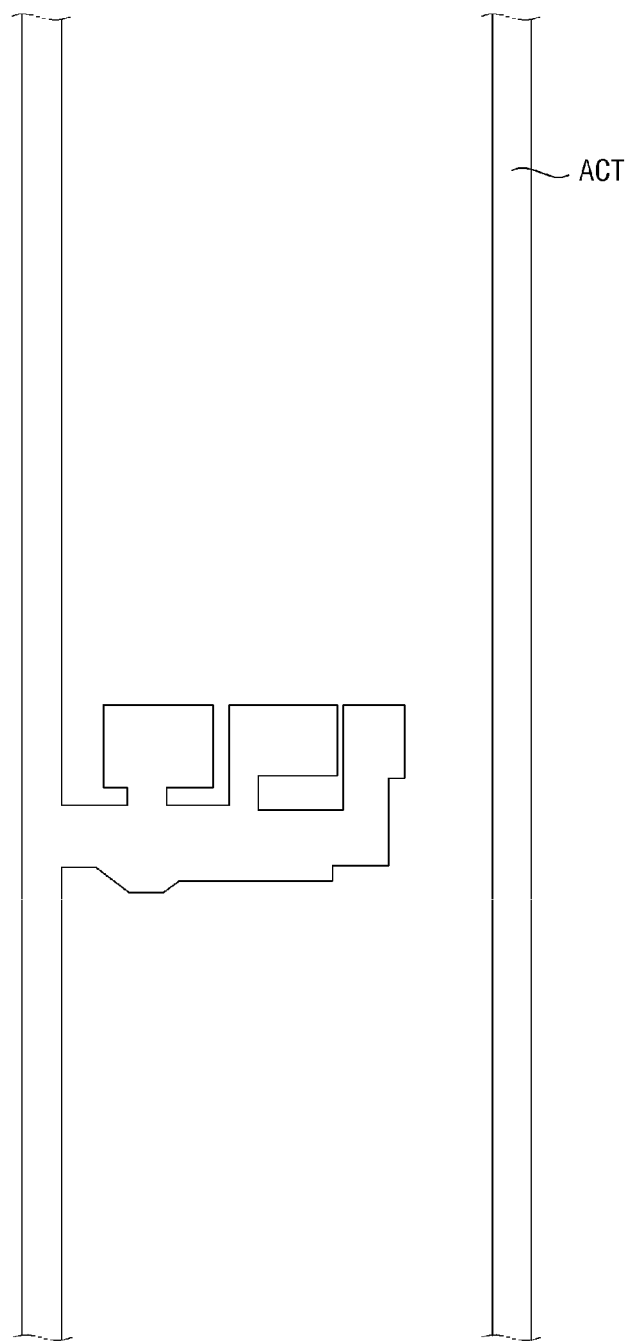
FIG. 13 is a plan view showing a semiconductor layer shown FIG. 11.
Figure 14:
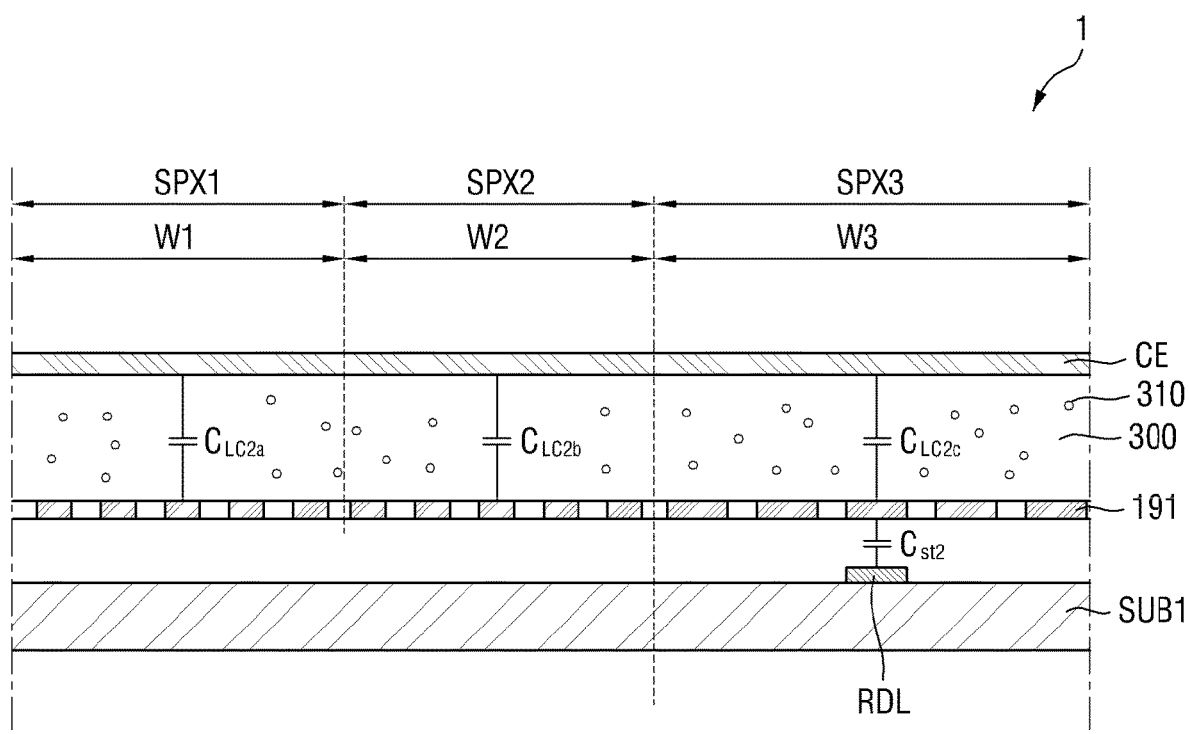
FIG. 14 is a schematic cross-sectional view showing a liquid crystal capacitor between a color pixel electrode and a common electrode in each color pixel, and a second storage capacitor between a third color pixel electrode and a voltage distribution line in a third color pixel.

FIG. 6 is a cross-sectional view taken along lines II-II' and III-III' of FIG. 4. FIG. 7 is a plan view showing a first conductive layer shown in FIG. 4. FIG. 8 is a plan view showing a second conductive layer shown in FIG. 4. FIG. 9 is a plan view showing a semiconductor layer shown in FIG. 4. FIG. 10 is a plan view showing a third conductive layer shown in FIG. 4. FIG. 11 is an enlarged layout diagram of a first color pixel SPX1 shown in FIG. 2. FIG. 12 is a plan view showing a second conductive layer shown in FIG. 11. FIG. 13 is a plan view showing a semiconductor layer shown in FIG. 11. FIG. 14 is a schematic cross-sectional view showing a liquid crystal capacitor between a color pixel electrode and the common electrode CE in each color pixel PX, and the second storage capacitor $C_{st2}$ between a third color pixel electrode and the voltage distribution line RDL in the third color pixel SPX3.

Referring to FIGS. 4, 5, 6, and 14, the substrate SUB may include a first substrate SUB1 and a second substrate SUB2 that faces the first substrate SUB1. The pixels PX may be disposed on the first substrate SUB1, and the common electrode CE may be disposed on the second substrate SUB2. A liquid crystal layer 300 including liquid crystal molecules 310 may be disposed between the pixels PX of the first substrate SUB1 and the common electrode CE of the second substrate SUB2.

The first substrate SUB1 may be made of an insulating material such as glass, quartz, or polymer resin. The polymeric material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. The first substrate SUB1 may include a metal material.

Referring to FIGS. 4, 5, 6, and 7, a first conductive layer may be disposed on the first substrate SUB1. The first conductive layer may include the scan line SL, a first gate electrode GE1, a second gate electrode GE2, a third gate electrode GE3, a first storage line CSTL1, and a second storage line CSTL2. The first gate electrode GE1 may be the gate electrode of the first transistor T1, the second gate electrode GE2 may be the gate electrode of the second transistor T2, and the third gate electrode GE3 may be the gate electrode of the third transistor T3.

The scan line SL, the first gate electrode GE1, the second gate electrode GE2, the third gate electrode GE3, and the first and second storage lines CSTL1 and CSTL2 may be formed of a first metal layer made of the same material, and may be disposed in the same layer. The first metal layer may include a single layer or multiple layers. The first metal layer including a single layer may include any one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu), or an alloy thereof. In addition, the first metal layer including multiple layers may include two or more layers made of the aforementioned materials. For example, the first metal layer may include two layers of molybdenum/aluminum-neodymium, molybdenum/aluminum, or copper/titanium.

The first gate electrode GE1, the second gate electrode GE2, and the third gate electrode GE3 may be electrically connected to the scan line SL, respectively. The first gate electrode GE1, the second gate electrode GE2, and the third gate electrode GE3 may be connected to each other, but the present disclosure is not limited thereto.

On the first conductive layer including the scan line SL, the first gate electrode GE1, the second gate electrode GE2, the third gate electrode GE3, and the first and second storage lines CSTL1 and CSTL2, a gate insulating layer GI that insulates the first conductive layer from the second conductive layer may be disposed. The gate insulating layer GI may include an inorganic insulating material such as a silicon compound and a metal oxide. For example, the gate insulating layer GI may include silicon oxide, silicon nitride, silicon oxynitride, aluminum oxide, tantalum oxide, hafnium oxide, zirconium oxide, titanium oxide, or a combination thereof. The gate insulating layer GI may be formed of a single layer or multiple layers of different materials. The second storage line CSTL2 may be electrically connected to the voltage distribution line RDL.

Referring to FIGS. 4, 5, 6, and 9, a semiconductor layer ACT may be disposed on the gate insulating layer GI. The semiconductor layer ACT may include a first semiconductor pattern AP1, a second semiconductor pattern AP2, and a third semiconductor pattern AP3. The first semiconductor pattern AP1 may correspond to an area overlapping the first electrode, the second electrode, and the gate electrode of the first transistor T1. The second semiconductor pattern AP2 may correspond to an area overlapping the first electrode, the second electrode, and the gate electrode of the second transistor T2. The third semiconductor pattern AP3 may correspond to an area overlapping the first electrode, the second electrode, and the gate electrode of the third transistor T3.

The first semiconductor pattern AP1, the second semiconductor pattern AP2, and the third semiconductor pattern AP3 include a first channel region CH1, a second channel region CH2, and a third channel region CH3, respectively. The first channel region CH1 may overlap the first gate electrode GE1 of the first transistor T1, the second channel region CH2 may overlap the second gate electrode GE2 of the second transistor T2, and the third channel region CH3 may overlap the third gate electrode GE3 of the third transistor T3. When an electric field is applied by the gate electrode, each of the first channel region CH1, the second channel region CH2, and the third channel region CH3 may be a region (or channel region) in which conductivity is inverted between the first electrode and the second electrode of the corresponding transistor to form a channel. The first semiconductor pattern AP1, the second semiconductor pattern AP2, and the third semiconductor pattern AP3 may be formed as a single pattern.

In one embodiment, the semiconductor layer ACT may include a silicon-based semiconductor material such as amorphous silicon, polycrystalline silicon, monocrystalline silicon, or the like. In another embodiment, the semiconductor layer ACT may include monocrystalline silicon, low temperature polycrystalline silicon, amorphous silicon, or the like. Further, the semiconductor layer ACT may include an oxide semiconductor. The semiconductor layer ACT may include, for example, a binary compound ($AB_x$), a ternary compound ($AB_xC_y$), or a quaternary compound ($AB_xC_yD_z$) containing indium (In), zinc (Zn), gallium (Ga), tin (Sn), titanium (Ti), aluminum (Al), hafnium (Hf), zirconium (Zr), magnesium (Mg), and the like. The semiconductor layer ACT may include ITZO (an oxide including indium, tin, and zinc) or IGZO (an oxide including indium, gallium and zinc).

Although not illustrated, an ohmic pattern including an ohmic contact layer may be disposed on the semiconductor layer ACT. The ohmic contact layer may be disposed between the first electrode and the second electrode of each of the first, second, and third transistors T1, T2, and T3, and the semiconductor layer ACT, thereby decreasing a Schottky barrier between metal and silicon, and decreasing a contact resistance therebetween. The ohmic contact layer may be formed of amorphous silicon doped with n-type impurities at a high concentration.

Referring to FIGS. 4, 5, 6, and 8, a second conductive layer may be disposed on the first substrate SUB1 and the semiconductor layer ACT. The second conductive layer may include the data line DL, the first electrode and the second electrode of each of the first, second, and third transistors T1, T2, and T3, and the voltage distribution line RDL. The data line DL, the first electrode and the second electrode of each of the first, second, and third transistors T1, T2, and T3, and the voltage distribution line RDL may be formed of a second metal layer made of the same material, and may be disposed in the same layer.

The second metal layer may include a single layer or multiple layers. The second metal layer including a single layer may include any one of molybdenum (Mo), aluminum (Al), platinum (Pt), palladium (Pd), silver (Ag), magnesium (Mg), gold (Au), nickel (Ni), neodymium (Nd), iridium (Jr), chromium (Cr), titanium (Ti), tantalum (Ta), tungsten (W) and copper (Cu), or an alloy thereof. In addition, the second metal layer including multiple layers may include two or more layers made of the aforementioned materials. For example, the second metal layer may include two layers of molybdenum/aluminum-neodymium, molybdenum/aluminum, or copper/titanium.

A predetermined voltage for voltage distribution may be applied to the voltage distribution line RDL. The voltage distribution line RDL may overlap the first color pixel electrode 191 and the second color pixel electrode 192 of the third color pixel SPX3.

A first electrode SE1 of the first transistor T1 may be electrically connected to the data line DL. The first electrode SE1 of the first transistor T1 may protrude from the data line DL and extend in the first direction DR1. The first electrode SE1 of the first transistor T1 may be directly connected to the data line DL. The first electrode SE1 of the first transistor T1 may be formed integrally with the data line DL. The first electrode SE1 of the first transistor T1 may be disposed on the semiconductor layer ACT and electrically connected to the first semiconductor pattern AP1. The first electrode SE1 of the first transistor T1 may have a curved shape, for example, a 'U' shape. More specifically, the 'U' shape of the first electrode SE1 of the first transistor T1 may include a first portion extending in the second direction DR2, a second portion spaced apart from the first portion in the first direction DR1, and a third portion connecting the first portion to the second portion and extending in the first direction DR1. A second electrode DE1 of the first transistor T1 may be disposed on the semiconductor layer ACT and electrically connected to the first semiconductor pattern AP1. The second electrode DE1 of the first transistor T1 may be disposed to be spaced apart from the first electrode SE1 of the first transistor T1 in the second direction DR2. The second electrode DE1 of the first transistor T1 may have a substantially rectangular shape in a plan view, and may partially protrude downward in the second direction DR2 toward the first electrode SE1 of the first transistor T1. The portion of the second electrode DE1 of the first transistor T1 protruding downward in the second direction DR2 may be surrounded by the first electrode SE1 of the first transistor T1 in the plan view.

A first electrode SE2 of the second transistor T2 may be electrically connected to the data line DL. The first electrode SE2 of the second transistor T2 may protrude from the data line DL and extend in the first direction DR1. The first electrode SE2 of the second transistor T2 may be directly connected to the data line DL. The first electrode SE2 of the second transistor T2 may be formed integrally with the data line DL. The first electrode SE2 of the second transistor T2 may be formed integrally with the first electrode SE1 of the first transistor T1. The first electrode SE2 of the second transistor T2 may be disposed on the semiconductor layer ACT and electrically connected to the second semiconductor pattern AP2. A second electrode DE2 of the second transistor T2 may be disposed on the semiconductor layer ACT and electrically connected to the second semiconductor pattern AP2. The second electrode DE2 of the second transistor T2 may be disposed to be spaced apart from the first electrode SE2 of the second transistor T2 in the first direction DR1. The second electrode DE2 of the second transistor T2 may have a substantially rectangular shape in a plan view, and may partially protrude downward in the second direction DR2. The portion of the second electrode DE2 of the second transistor T2 protruding downward in the second direction DR2 may be disposed in parallel with the first electrode SE2 of the second transistor T2.

A first electrode SE3 of the third transistor T3 may be electrically connected to the voltage distribution line RDL. The first electrode SE3 of the third transistor T3 according to an embodiment may be directly connected to the voltage distribution line RDL, and may be formed integrally therewith. A second electrode DE3 of the third transistor T3 may be disposed on the semiconductor layer ACT and electrically connected to the third semiconductor pattern AP3. The second electrode DE3 of the third transistor T3 may be disposed to be spaced apart from the first electrode SE3 of the third transistor T3 in the first direction DR1. The second electrode DE3 of the third transistor T3 may have a substantially rectangular shape in a plan view, and may partially protrude downward in the second direction DR2. The portion of the second electrode DE3 of the third transistor T3 protruding downward in the second direction DR2 may be disposed in parallel with the first electrode SE3 of the third transistor T3. The second electrode DE3 of the third transistor T3 may be electrically connected to the second electrode DE2 of the second transistor T2. The second electrode DE3 of the third transistor T3 may be physically connected to the second electrode DE2 of the second transistor T2, and may be further formed integrally therewith.

Referring to FIGS. 4, 8, and 9, the semiconductor layer ACT may have the substantially same shape as the shape of the second conductive layer in a plan view. The semiconductor layer ACT may be further disposed in a space between the second electrode DE3 of the third transistor T3 and the first electrode SE3 of the third transistor T3.

A first insulating layer 111 may be disposed on the first substrate SUB1 on which the first transistor T1, the second transistor T2, and the third transistor T3 are formed. The first insulating layer 111 may include an inorganic insulating material. The first insulating layer 111 may include an organic insulating material in some embodiments.

Color filters 112 may be disposed on the first insulating layer 111. The color filters 112 may include a red color filter, a green color filter, and a blue color filter. The red color filter may be disposed in the first color pixel SPX1, the green color filter may be disposed in the second color pixel SPX2, and the blue color filter may be disposed in the third color pixel SPX3. The red color filter, the green color filter, and the blue color filter may overlap each other at the boundaries between the color pixels SPX1, SPX2 and SPX3. However, the present disclosure is not limited thereto, and the red color filter, the green color filter, and the blue color filter may not overlap each other.

A second insulating layer 113 may be disposed on the color filters 112. The second insulating layer 113 may be an overcoat layer. The second insulating layer 113 may include an organic insulating material.

Referring to FIGS. 4, 5, 6, and 10, a third conductive layer may be disposed on the second insulating layer 113. The third conductive layer may include the first color pixel electrode 191 and the second color pixel electrode 192. The first color pixel electrode 191 may include a first stem portion 191a and a plurality of first branch portions 191b extending outwardly from the first stem portion 191a and spaced apart from each other with a slit 191c disposed therebetween in the first sub-pixel portion PA1, and a first extension portion 191d extending from the first sub-pixel portion PA1 toward the switching element region TA.

The first stem portion 191a includes a horizontal stem portion extending in the first direction DR1 and a vertical stem portion extending in the second direction DR2. The first stem portion 191a may divide the first color pixel electrode 191 into sub-regions or domains. For example, the first stem portion 191a may have a cross shape. In this case, the first color pixel electrode 191 may be divided into four sub-regions by the first stem portion 191a. The first branch portions 191b located in each of the sub-regions may extend in different directions. For example, as shown in FIG. 4, the first branch portions 191b positioned in an upper right sub-region may extend obliquely in an upper-right direction from the first stem portion 191a, and the first branch portions 191b positioned in a lower right sub-region may extend obliquely in a lower-right direction from the first stem portion 191a. In addition, the first branch portions 191b located in an upper left sub-region may extend obliquely in an upper-left direction from the first stem portion 191a, and the first branch portions 191b located in a lower left sub-region may extend obliquely in a lower-left direction from the first stem portion 191a. The first extension portion 191d may extend from the first branch portion 191b toward the switching element region TA.

The second color pixel electrode 192 may include a second stem portion 192a located, a plurality of second branch portions 192b extending outwardly from the second stem portion 192a and spaced apart from each other with a slit 192c disposed therebetween in the second sub-pixel portion PA2, and a second extension portion 192d extending from the second sub-pixel portion PA2 toward the switching element region TA.

The second stem portion 192a, the second branch portions 192b, and the second extension portion 192d may be substantially the same as or similar to the first stem portion 191a, the first branch portions 191b, and the first extension portion 191d, respectively.

The planar size of the first color pixel electrode 191 may be larger than the planar size of the second color pixel electrode 192. In one embodiment, the planar size of the first and second color pixel electrodes 191 and 192 is determined based on the width in the first direction DR1 and the width in the second direction DR2. The width in the first direction DR1 may be defined as a width from a portion closest to the data line DL of the third color pixel SPX3 of each of the first and second color pixel electrodes 191 and 192 to a portion closest to the data line DL of a color pixel adjacent to the third color pixel SPX3 of each of the first and second color pixel electrodes 191 and 192 in the first direction DR1. The width of the first color pixel electrode 191 in the second direction DR2 may be defined as a width from a portion closest to the first storage line CSTL1 of the first color pixel electrode 191 of the third color pixel SPX3 to another portion closest to the second storage line CSTL2 of the color pixel adjacent to the third color pixel SPX3 upward in the second direction DR2. The width of the second color pixel electrode 192 in the second direction DR2 may be defined as a width from a portion closest to the scan line SL of the second color pixel electrode 192 of the third color pixel SPX3 to another portion closest to the main storage line portion of the second storage line CSTL2 of the third color pixel SPX3.

As illustrated in FIG. 4, the first color pixel electrode 191 and the second color pixel electrode 192 may have substantially the same width in the first direction DR1, but the width of the first color pixel electrode 191 may be greater than the width of the second color pixel electrode 192 in the second direction DR2.

Further, the size of the first and second color pixel electrodes 191 and 192 may be proportional to the size of each of the first, second, and third color pixels SPX1, SPX2, and SPX3. That is, the planar size of the first color pixel electrode 191 of the first color pixel SPX1 may be larger than the planar size of the first color pixel electrode 191 of the second color pixel SPX2 and the third color pixel SPX3, and the planar size of the second color pixel electrode 192 of the first color pixel SPX1 may be larger than the planar size of the second color pixel electrode 192 of the second color pixel SPX2 and the third color pixel SPX3.

A third conductive layer including the first color pixel electrode 191 and the second color pixel electrode 192 may be formed of a transparent material through which light can be transmitted. The third conductive layer may be formed of, for example, indium tin oxide (ITO), indium zinc oxide (IZO), or indium tin zinc oxide (ITZO), but the present disclosure is not limited thereto. Any material that is transparent and conductive may be used as the third conductive layer.

Each of the first color pixel electrode 191 and the second color pixel electrode 192 may be disposed to overlap the voltage distribution line RDL in the thickness direction of the display device 1.

The second electrode DE1 of the first transistor T1 may be electrically connected to the second color pixel electrode 192. The second electrode DE1 of the first transistor T1 may be electrically connected to the second extension portion 192d of the second color pixel electrode 192. A first contact hole CNT1 may penetrate through the second insulating layer 113, the color filter 112, and the first insulating layer 111 in the thickness direction. The second extension portion 192d and the second electrode DE1 of the first transistor T1 may be electrically connected through the first contact hole CNT1.

The second electrode DE2 of the second transistor T2 may be electrically connected to the first color pixel electrode 191. The second electrode DE2 of the second transistor T2 may be electrically connected to the first extension portion 191d of the first color pixel electrode 191. A second contact hole CNT2 may penetrate through the second insulating layer 113, the color filter 112, and the first insulating layer 111 in the thickness direction. The first extension portion 191d and the second electrode DE2 of the second transistor T2 may be electrically connected through the second contact hole CNT2.

Meanwhile, the third conductive layer may further include a pixel bridge pattern 193 disposed in the switching element region TA. The pixel bridge pattern 193 may be physically spaced apart from the first color pixel electrode 191 and the second color pixel electrode 192, respectively. The pixel bridge pattern 193 may be disposed between the first color pixel electrode 191 and the second color pixel electrode 192. A third contact hole CNT3 may penetrate through the second insulating layer 113, the color filter 112, and the first insulating layer 111 in the thickness direction. Further, a fourth contact hole CNT4 may penetrate through the second insulating layer 113, the color filter 112, the first insulating layer 111, and the gate insulating layer GI in the thickness direction. The pixel bridge pattern 193 may be electrically connected to the first storage line CSTL1 through the fourth contact hole CNT4, and may be electrically connected to the voltage distribution line RDL through the third contact hole CNT3. The pixel bridge pattern 193 may be connected to the first storage line CSTL1 through the fourth contact hole CNT4 in a region that does not overlap the voltage distribution line RDL.

The first contact hole CNT1 to the third contact hole CNT3 may be aligned in the first direction DR1 as illustrated in FIG. 4. However, the present disclosure is not limited thereto, and the arrangement of the first contact hole CNT1 to the third contact hole CNT3 may be variously changed.

The second substrate SUB2 facing the first substrate SUB1 may be provided with a light blocking member BM and the common electrode CE. The second substrate SUB2 may be a transparent insulating substrate similar to the first substrate SUB1. Further, the second substrate SUB2 may include a polymer or a plastic having high heat resistance. The second substrate SUB2 may have flexibility.

The light blocking member BM may be positioned on one surface of the second substrate SUB2 that faces the first substrate SUB1. The light blocking member BM may overlap the switching element region TA. The light blocking member BM may include a light blocking pigment such as carbon black or an opaque material such as chromium (Cr), and may include a photosensitive organic material. However, the present disclosure is not limited thereto, and the light blocking member BM may be disposed on the first substrate SUB1 in some embodiments.

The common electrode CE may be disposed on the light blocking member BM. The common electrode CE may be formed of a transparent conductive material such as indium tin oxide (ITO), indium zinc oxide (IZO), indium tin zinc oxide (ITZO), or the like. The common electrode CE may cover the entire surface of the second substrate SUB2. The common electrode CE may be applied with a common voltage to form an electric field in conjunction with the first color pixel electrode 191 and the second color pixel electrode 192. In this case, the arrangement of the liquid crystal molecules of the liquid crystal layer 300 varies according to the electric field, so that light transmittance can be controlled.

The liquid crystal layer 300 is disposed between the first substrate SUB1 and the second substrate SUB2. The liquid crystal layer 300 may include the liquid crystal molecules having dielectric anisotropy. When an electric field is applied between the first substrate SUB1 and the second substrate SUB2, the liquid crystal molecules may orient in a specific direction between the first substrate SUB1 and the second substrate SUB2, thereby adjusting a phase retardation value of light passing through the liquid crystal layer 300. An amount of polarized light (e.g., light that has passed through a lower polarization member (not shown)) passing through an upper polarization member (not shown; for example, disposed on an emission side attached to the outer surface of the second substrate SUB2) varies according to the amount of the phase retardation value adjusted by the rotation of the liquid crystal molecules, so that the light transmittance can be controlled.

The layout diagram of the first color pixel SPX1 and the second color pixel SPX2 may be similar to that of the third color pixel SPX3, but there are differences from that of the third color pixel SPX3 in that the voltage distribution line RDL is not disposed, the first electrode SE3 of the third transistor T3 is not directly connected to the voltage distribution line RDL, and a portion of the semiconductor layer ACT substantially overlapping the voltage distribution line RDL is omitted because the voltage distribution line RDL is not disposed.

As illustrated in FIG. 11, the pixel bridge pattern 193 in the third color pixel SPX3 may be similarly disposed in the switching element region TA of the first color pixel SPX1. The pixel bridge pattern 193 may be electrically connected to the first electrode SE3 of the third transistor T3 and the first storage line CSTL1 through the third contact hole CNT3 and the fourth contact hole CNT4 in the first color pixel SPX1, respectively. The first electrode SE3 of the third transistor T3 in the first color pixel SPX1 may be physically spaced apart from the second electrode DE3 of the third transistor T3. The layout diagram of the second color pixel SPX2 may be substantially the same as the layout diagram of the first color pixel SPX1.

Figure 15:
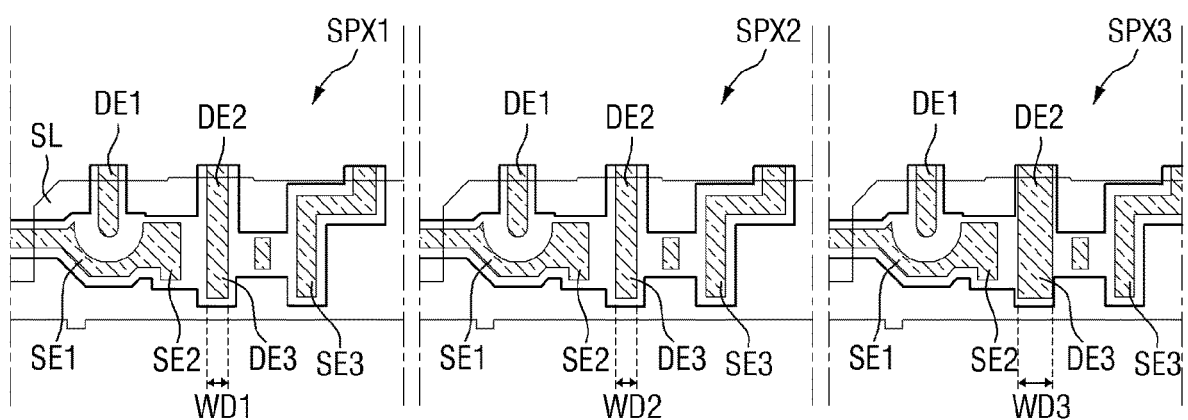
FIG. 15 is an enlarged schematic layout diagram of a portion shown in FIG. 2 according to an embodiment.

FIG. 14 is a schematic cross-sectional view showing a liquid crystal capacitor between a color pixel electrode and the common electrode CE in each color pixel, and the second storage capacitor $C_{st2}$ between a third color pixel electrode and the voltage distribution line RDL in the third color pixel SPX3. FIG. 15 is an enlarged schematic layout diagram of a portion shown in FIG. 2 according to an embodiment.

Referring to FIG. 14, the display device 1 includes the first, second, and third color pixels SPX1, SPX2, and SPX3. For convenience of illustration, FIG. 14 illustrates only the first substrate SUB1, the voltage distribution line RDL disposed on the first substrate SUB1 in the third color pixel SPX3, the first color pixel electrode 191 disposed in each of the first, second, and third color pixels SPX1, SPX2, and SPX3, the liquid crystal layer 300 including the liquid crystal molecules 310, and the common electrode CE disposed on the color pixels SPX1, SPX2 and SPX3. The first stem portion 191a and the first branch portions 191b disposed in each of the first, second, and third color pixels SPX1, SPX2, and SPX3 are shown as being separated from each other in the cross-sectional view.

Referring to FIGS. 14 and 15, the liquid crystal layer 300 may be disposed to overlap the first, second, and third color pixels SPX1, SPX2, and SPX3, and the liquid crystal layer 300 may be aligned at a boundary between the adjacent ones of the first, second, and third color pixels SPX1, SPX2, and SPX3.

As described above, the width W3 of the third color pixel SPX3 may be larger than the width W1 of the first color pixel SPX1 and the width W2 of the second color pixel SPX2 in the first direction DR1 in the plan view, and the size of the first and second color pixel electrodes 191 and 192 may be proportional to the size of each of the first, second, and third color pixels SPX1, SPX2, and SPX3. That is, the planar size of the first color pixel electrode 191 of the first color pixel SPX1 may be larger than the planar size of the first color pixel electrode 191 of the second color pixel SPX2 and the third color pixel SPX3, and the planar size of the second color pixel electrode 192 of the first color pixel SPX1 may be larger than the planar size of the second color pixel electrode 192 of the second color pixel SPX2 and the third color pixel SPX3.

The magnitude of the liquid crystal capacitance of the liquid crystal capacitor formed between the first and second color pixel electrodes 191 and 192 and the common electrode CE may vary according to an overlapping area thereof. That is, the larger the area of the first and second color pixel electrodes 191 and 192, the larger the magnitude of the liquid crystal capacitance of the liquid crystal capacitor formed therebetween. Since the widths of the first and second color pixel electrodes 191 and 192 of the third color pixel SPX3 are larger than those of the first and second color pixel electrodes 191 and 192 of the first color pixel SPX1 and the second color pixel SPX2 in the first direction DR1, respectively, the magnitude of the liquid crystal capacitance $C_{LC2c}$ of the third color pixel SPX3 may be larger than the magnitude of the liquid crystal capacitance $C_{LC2a}$ of the first color pixel SPX1 and the liquid crystal capacitance $C_{LC2b}$ the second color pixel SPX2.

Further, as described above, the first and second color pixel electrodes 191 and 192 in the third color pixel SPX3 are disposed to overlap the voltage distribution line RDL, and the second-b storage capacitor $C_{st2b}$ may be formed between the voltage distribution line RDL and the first and second color pixel electrodes 191 and 192. However, in the first color pixel SPX1 and the second color pixel SPX2, the first and second color pixel electrodes 191 and 192 do not overlap the voltage distribution line RDL, therefore the second-b storage capacitor $C_{st2b}$ is not formed therein. The total magnitude of the storage capacitor of the third color pixel SPX3 is the sum of the capacitance of the second-a storage capacitor $C_{st2a}$ and the capacitance of the second-b storage capacitor $C_{st2b}$, and it may be larger than the storage capacitance of the first color pixel SPX1 and the second color pixel SPX2, respectively.

Each of the liquid crystal capacitance and the storage capacitance may cause a kickback in a data driving signal (e.g., a data voltage) due to a gate driving signal (e.g., a gate voltage). A kickback voltage due to the kickback refers to an amount of a voltage change in the data driving signal applied to the first and second color pixel electrodes 191 and 192 according to a transition of the gate driving signal when the gate driving signal falls from a high voltage (e.g., a gate-on voltage $V_{on}$) to a low voltage (e.g., a gate-off voltage $V_{off}$).

A kickback voltage $V_{kb}$ of the data driving signal is calculated using the following Eq. 1:

$$V_{kb} = \frac{C_{gs}}{(C_{st} + C_{LC} + C_{gs})}(V_{on} - V_{off}) \qquad \text{Eq. 1}$$

In Eq. 1, $C_{LC}$ represents a liquid crystal capacitance value of a liquid crystal capacitor formed between the first and second color pixel electrodes 191 and 192 and the common electrode CE, $C_{st}$ represents a storage capacitance value of the storage capacitor formed between the first and second storage lines CSTL1 and CSTL2 and the first and second color pixel electrodes 191 and 192, and $C_{gs}$ represents a gate-drain capacitance value of the gate-drain capacitor formed between the first, second, and third gate electrodes GE1, GE2, and GE3 of each of the first, second, and third transistors T1, T2, and T3 and the second electrode of each of the first, second, and third transistors T1, T2, and T3.

According to Eq. 1, the kickback voltage $V_{kb}$ may be inversely proportional to the liquid crystal capacitance value $C_{LC}$ of the liquid crystal capacitor, and the storage capacitance value $C_{st}$ of the storage capacitor, and may be proportional to the gate-drain capacitance value $C_{gs}$ of the gate-drain capacitor.

Referring to FIG. 15, a width WD3 of the second electrode DE2 of the second transistor T2 in the third color pixel SPX3 may be greater than each of a width WD1 of the second electrode DE2 of the second transistor T2 in the first color pixel SPX1, and a width WD2 of the second electrode DE2 of the second transistor T2 in the second color pixel SPX2. For example, the width WD3 of the second electrode DE2 of the second transistor T2 in the third color pixel SPX3 may be at least about 10% larger than the width WD1 of the second electrode DE2 of the second transistor T2 in the first color pixel SPX1 and the width WD2 of the second electrode DE2 of the second transistor T2 in the second color pixel SPX2. That is, the magnitude of the gate-drain capacitance value $C_{gs}$ of the gate-drain capacitor $C_{gs1}$ of the second transistor T2 in the third color pixel SPX3 may be greater than the magnitude of the gate-drain capacitance value $C_{gs}$ of the gate-drain capacitor $C_{gs1}$ of the second transistor T2 in each of the first color pixel SPX1 and the second color pixel SPX2.

Accordingly, although the magnitude of the liquid crystal capacitance value $C_{LC}$ of the third color pixel SPX3 may be greater than the magnitude of the liquid crystal capacitance value $C_{LC}$ of the first color pixel SPX1 and the second color pixel SPX2, and the total amount of the storage capacitor value $C_{st}$ of the third color pixel SPX3 that is the sum of the capacitance value of the second-a storage capacitor $C_{st2a}$ and the capacitance value of the second-b storage capacitor $C_{st2b}$ may be larger than the storage capacitance value $C_{st}$ of the first color pixel SPX1 and the second color pixel SPX2, respectively because the magnitude of the gate-drain capacitance value $C_{gs}$ of the gate-drain capacitor $C_{gs1}$ of the second transistor T2 in the third color pixel SPX3 is larger than the magnitude of the gate-drain capacitance value $C_{gs}$ of the gate-drain capacitor $C_{gs1}$ of the second transistor T2 in each of the first color pixel SPX1 and the second color pixel SPX2, the kickback voltage $V_{kb}$ between the first, second, and third color pixels SPX1, SPX2, and SPX3 can be uniformly controlled. Therefore, it is possible to prevent a deterioration of image quality due to a variation in the kickback voltage $V_{kb}$ between the first, second, and third color pixels SPX1, SPX2, and SPX3.

Hereinafter, other embodiments of the present disclosure will be described. In the following embodiments, a description of the same components as those of the above-described embodiments will be omitted or simplified, and differences will be mainly described.

Figure 16:
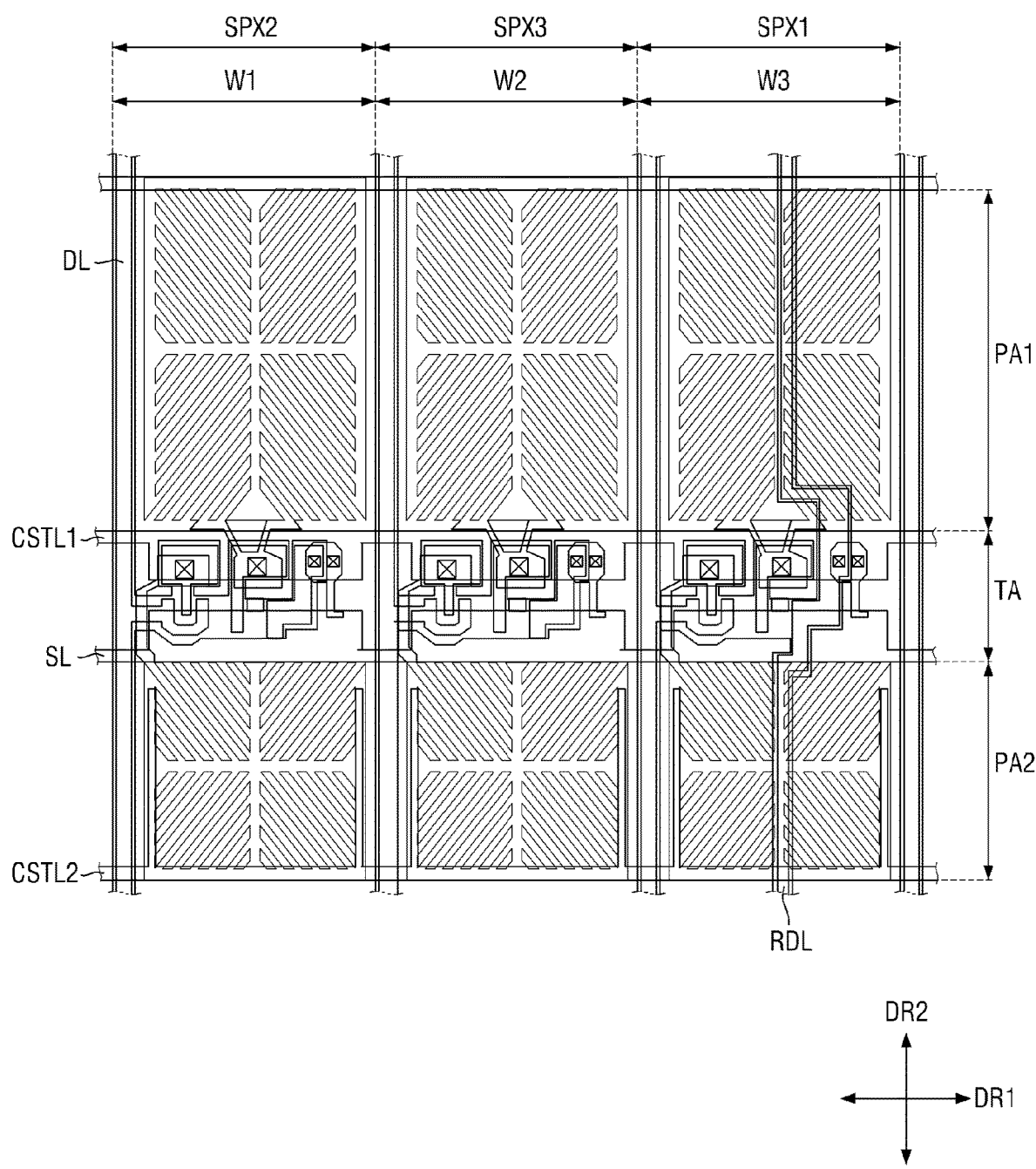
FIG. 16 is an enlarged layout diagram of a pixel of the display device shown in FIG. 1 according to another embodiment.
Figure 17:
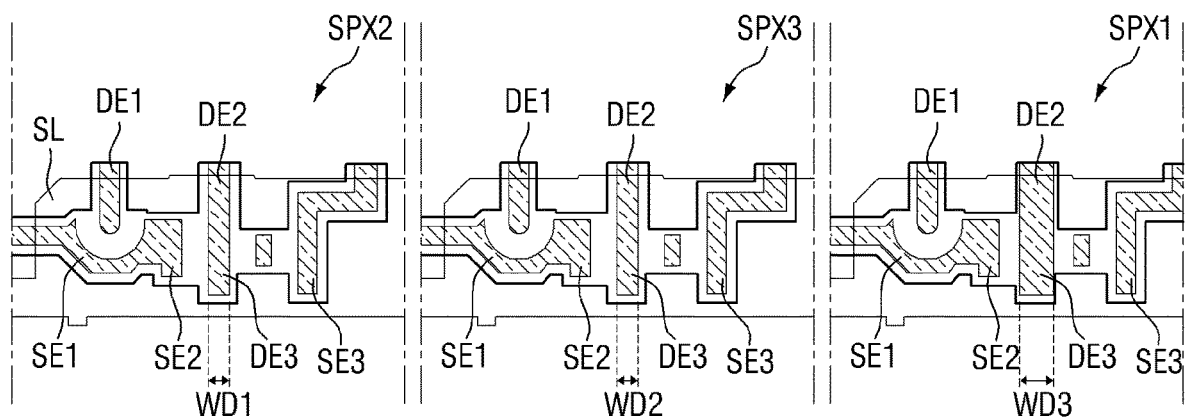
FIG. 17 is a schematic layout diagram of an enlarged portion shown in FIG. 16.

FIG. 16 is an enlarged layout diagram of a pixel of the display device shown in FIG. 1 according to another embodiment. FIG. 17 is a schematic layout diagram of an enlarged portion of FIG. 16.

Referring to FIGS. 16 and 17, the pixel PX of the display device 1 includes a first color pixel SPX1 that is the same as the third color pixel SPX3 according to the embodiment of FIGS. 2 and 15, and a third color pixel SPX3 that is the same as the first color pixel SPX1 according to the embodiment of FIGS. 2 and 15.

Other configurations are substantially the same as those described above with reference to FIGS. 1 to 15, and thus, a repeated description is omitted.

Figure 18:
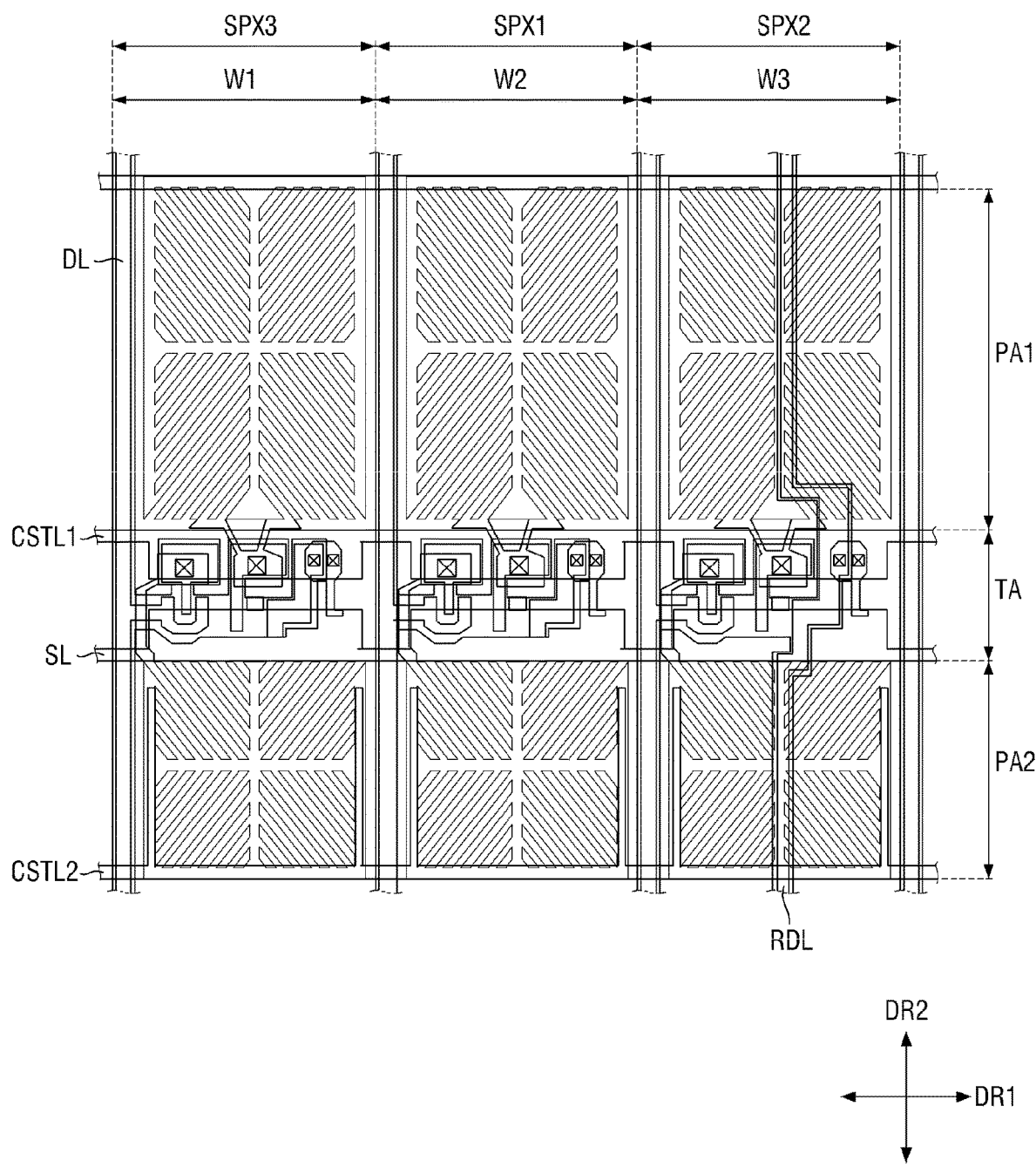
FIG. 18 is an enlarged layout diagram of a pixel of the display device of FIG. 1 according to still another embodiment.
Figure 19:
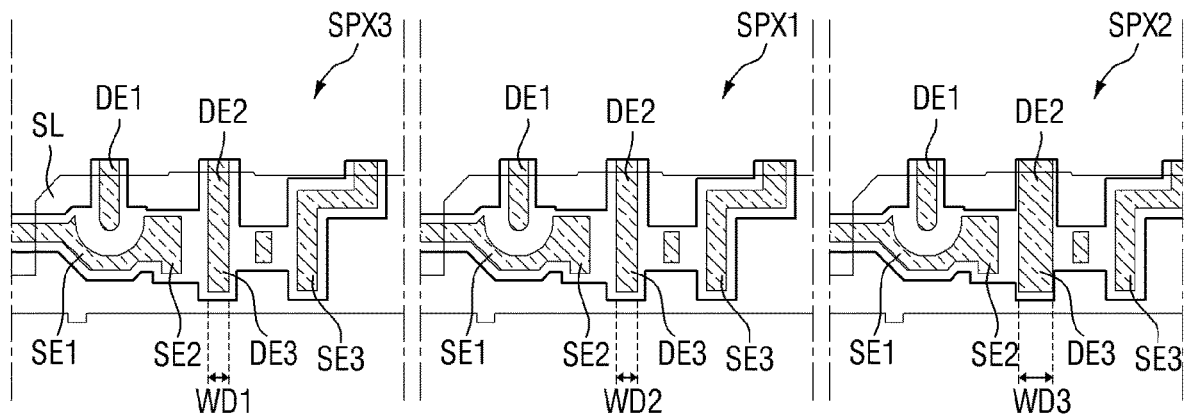
FIG. 19 is a schematic layout diagram of an enlarged portion of FIG. 18.

FIG. 18 is an enlarged layout diagram of a pixel of the display device shown in FIG. 1 according to still another embodiment. FIG. 19 is a schematic layout diagram of an enlarged portion of FIG. 18.

Referring to FIGS. 18 and 19, the pixel PX of the display device 1 includes a second color pixel SPX2 that is the same as the third color pixel SPX3 according to the embodiment of FIGS. 2 and 15, and a third color pixel SPX3 that is the same as the second color pixel SPX2 according to the embodiment of FIGS. 2 and 15.

Other configurations are substantially the same as those described above with reference to FIGS. 1 to 15, and thus, a repeated description is omitted.

Figure 20:
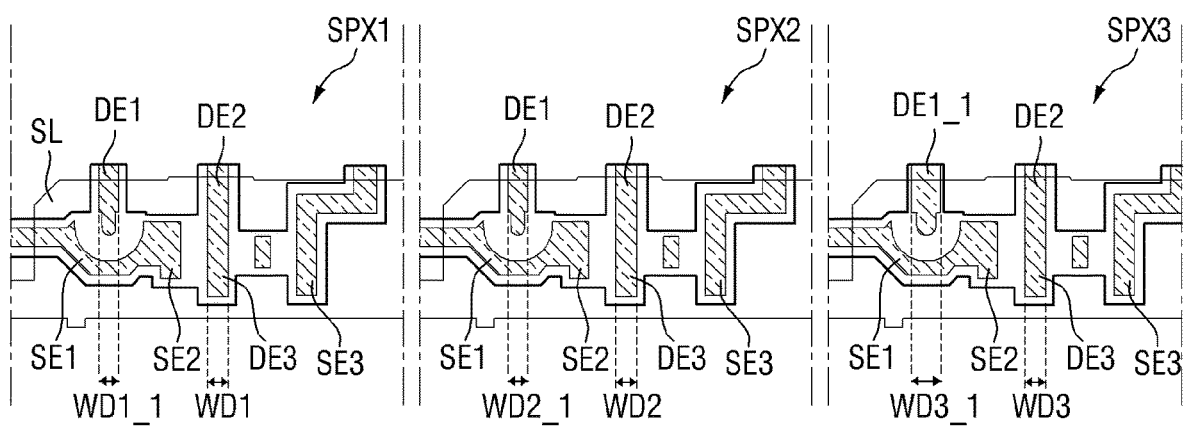
FIG. 20 is a schematic layout diagram of each color pixel according to another embodiment.

FIG. 20 is a schematic layout diagram of each color pixel according to another embodiment.

Referring to FIG. 20, each of the first, second, and third color pixels SPX1, SPX2, and SPX3 of the display device 1 is different from the embodiment shown in FIG. 15 in that a width WD3_1 of a second electrode DE1_1 of the first transistor T1 in the third color pixel SPX3 is greater than a width WD1_1 of the second electrode DE1 of the first transistor T1 in the first color pixel SPX1, and a width WD2_1 of the second electrode DE1 of the first transistor T1 in the second color pixel SPX2, respectively.

More specifically, each of the first, second, and third color pixels SPX1, SPX2, and SPX3 of the display device 1 according to the present embodiment may be configured such that the width WD3_1 of the second electrode DE1_1 of the first transistor T1 in the third color pixel SPX3 is greater than the width WD1_1 of the second electrode DE1 of the first transistor T1 in the first color pixel SPX1, and the width WD2_1 of the second electrode DE1 of the first transistor T1 in the second color pixel SPX2, respectively. That is, the width of each of the first, second, and third color pixels SPX1, SPX2, and SPX3 is adjusted by adjusting the widths of the second electrodes DE1 and DE1_1 of the first transistor T1 connected to the second sub-pixel portion PA2, compared to the embodiment of FIG. 15 in which the kickback voltage $V_{kb}$ of each of the first, second, and third color pixels SPX1, SPX2, and SPX3 is made uniform by adjusting the width of the second electrode DE2 of the second transistor T2 connected to the first sub-pixel portion PA1.

Other configurations are substantially the same as those described above with reference to FIGS. 1 to 15, and thus, a repeated description is omitted.

It is understood that those skilled in the art will appreciate that many variations and modifications can be made to the embodiments without substantially departing from the principles of the present disclosure. Therefore, the embodiments of the present disclosure disclosed herein are used and understood in a generic and descriptive sense and not for purposes of limitation.

What is claimed is:

1. A display device comprising:
a display panel including a plurality of pixels, a pixel of the plurality of pixels including a first color pixel, a second color pixel, and a third color pixel;
a gate driver connected to the pixel through a scan line extending in a first direction; and
a data driver connected to the pixel through a data line extending in a second direction that intersects the first direction,
wherein each of the first color pixel, the second color pixel, and the third color pixel includes a color pixel electrode and a first transistor having a first electrode connected to the data line, a second electrode connected to the color pixel electrode, and a gate electrode connected to the scan line,
wherein the display device further comprises a voltage distribution line that is disposed to overlap the color pixel electrode of the third color pixel in a thickness direction of the display device, extends in the second direction,
wherein a first width of the second electrode of the first transistor of the third color pixel in the first direction is greater than a second width of the second electrode of the first transistor of each of the first color pixel and the second color pixel in the first direction,
wherein each of the first color pixel, the second color pixel, and the third color pixel further includes a second transistor having a first electrode connected to the data line and a second electrode connected to the color pixel electrode,
wherein the display panel further includes a storage line extending in the first direction, and the second electrode of the second transistor of the first color pixel, the second color pixel, and the third color pixel is electrically connected to the storage line, and
wherein the voltage distribution line overlaps the storage line in a plan view.

2. The display device of claim 1, wherein the first color pixel is a red pixel, the second color pixel is a green pixel, and the third color pixel is a blue pixel.

3. The display device of claim 1, wherein the first width is at least 10% larger than the second width.

4. The display device of claim 1, wherein a pixel bridge pattern is further disposed in each of the first color pixel, the second color pixel, and the third color pixel, and
wherein the second electrode of the second transistor in each of the first color pixel, the second color pixel, and the third color pixel is electrically connected to the storage line through the pixel bridge pattern.

5. The display device of claim 4, wherein each of the first color pixel, the second color pixel, and the third color pixel includes a first sub-pixel portion and a second sub-pixel portion, and
wherein the first sub-pixel portion and the second sub-pixel portion are spaced apart from each other with the scan line and the storage line interposed therebetween.

6. The display device of claim 5, wherein the display panel further includes a first sub-pixel electrode disposed in the first sub-pixel portion, and a second sub-pixel electrode disposed in the second sub-pixel portion, and
wherein a first planar size of the first sub-pixel electrode is larger than a second planar size of the second sub-pixel electrode.

7. The display device of claim 6, wherein each of the first color pixel, and the second color pixel, and the third color pixel further includes a third transistor having a first electrode connected to the voltage distribution line and a second electrode connected to the first sub-pixel electrode, and
wherein the second electrode of the first transistor is connected to the second sub-pixel electrode.

8. The display device of claim 7, wherein the display panel further includes a first substrate, a second substrate facing the first substrate, and a liquid crystal layer disposed between the first substrate and the second substrate,
wherein the plurality of pixels is disposed between the first substrate and the liquid crystal layer, and the display panel further includes a common electrode disposed between the second substrate and the liquid crystal layer,
wherein each of the first sub-pixel electrode and the second sub-pixel electrode of the first color pixel, the second color pixel, and the third color pixel is configured to form a liquid crystal capacitor in conjunction with the common electrode, and
wherein a first liquid crystal capacitance of the first sub-pixel electrode that is formed in conjunction with the common electrode is smaller than a second liquid crystal capacitance of the second sub-pixel electrode that is formed in conjunction with the common electrode.

9. The display device of claim 8, wherein the second electrode of the second transistor is connected to the second electrode of the third transistor.

10. The display device of claim 9, wherein the first sub-pixel electrode of the first color pixel, the second color pixel, and the third color pixel is configured to form a storage capacitor in conjunction with the storage line, and
wherein the first sub-pixel electrode of the third color pixel is disposed to overlap the voltage distribution line to further form a storage parasitic capacitor.

11. The display device of claim 10, wherein the second electrode of the first transistor of each of the first color pixel, and the second color pixel, and the third color pixel is disposed to overlap the scan line to form a gate-drain capacitor, and
wherein a first gate-drain capacitance formed between the scan line and the second electrode of the first transistor of the third color pixel is greater than a second gate-drain capacitance formed between the scan line and the second electrode of the first transistor of each of the first color pixel and the second color pixel.

12. The display device of claim 6, wherein each of the first color pixel, the second color pixel, and the third color pixel further includes a third transistor,
wherein the first electrode of the second transistor is connected to the data line, and the second electrode of the second transistor is connected to the first sub-pixel electrode, and
wherein the second electrode of the third transistor is connected to the second electrode of the second transistor, and the second electrode of the first transistor is connected to the second sub-pixel electrode.

13. A display device comprising:
a display panel including a plurality of pixels, a pixel of the plurality of pixels including a first color pixel, a second color pixel, and a third color pixel;
a gate driver connected to the pixel through a scan line extending in a first direction; and
a data driver connected to the pixel through a data line extending in a second direction that intersects the first direction,
wherein each of the first color pixel, the second color pixel, and the third color pixel includes a color pixel electrode and a first transistor having a first electrode connected to the data line, a second electrode connected to the color pixel electrode, and a gate electrode connected to the scan line,
wherein the display device further comprises a voltage distribution line that is disposed to overlap the color pixel electrode of the third color pixel in a thickness direction of the display device, extends in the second direction,
wherein a first width of the color pixel electrode of the third color pixel in the first direction is greater than a second width of the color pixel electrode of each of the first color pixel and the second color pixel in the first direction,
wherein a third width of the second electrode of the first transistor of the third color pixel in the first direction is greater than a fourth width of the second electrode of the first transistor of each of the first color pixel and the second color pixel in the first direction,
wherein each of the first color pixel, the second color pixel, and the third color pixel further includes a second transistor having a first electrode connected to the data line and a second electrode connected to the color pixel electrode, wherein the display panel further includes a storage line extending in the first direction,
wherein the second electrode of the second transistor of the first color pixel, the second color pixel, and the third color pixel is electrically connected to the storage line, and
wherein the voltage distribution line overlaps the storage line in a plan view.

14. The display device of claim 13, wherein each of the first color pixel, the second color pixel, and the third color pixel includes a first sub-pixel portion and a second sub-pixel portion,
wherein the first sub-pixel portion and the second sub-pixel portion are spaced apart from each other with the scan line and the storage line interposed therebetween,
wherein the display panel includes a first sub-pixel electrode disposed in the first sub-pixel portion, and a second sub-pixel electrode disposed in the second sub-pixel portion, and
wherein a first planar size of the first sub-pixel electrode is larger than a second planar size of the second sub-pixel electrode.

15. The display device of claim 14, wherein each of the first color pixel, the second color pixel, and the third color pixel further includes a third transistor,
wherein a first electrode of the third transistor is directly connected to the voltage distribution line, and a second electrode of the third transistor is connected to the first sub-pixel electrode, and
wherein the second electrode of the first transistor is connected to the second sub-pixel electrode.

16. The display device of claim 15, wherein the display panel includes a first substrate, a second substrate facing the first substrate, and a liquid crystal layer disposed between the first substrate and the second substrate,
wherein the plurality of pixels is disposed between the first substrate and the liquid crystal layer, and the display panel further includes a common electrode disposed between the second substrate and the liquid crystal layer,
wherein the first sub-pixel electrode of the first color pixel, the second color pixel, and the third color pixel is configured to form a liquid crystal capacitor in conjunction with the common electrode, and
wherein a first liquid crystal capacitance of the liquid crystal capacitor of the first sub-pixel electrode of the third color pixel that is formed in conjunction with the common electrode is greater than a second liquid crystal capacitance of the liquid crystal capacitor of the first sub-pixel electrode of the first color pixel and the second color pixel that is in conjunction with the common electrode.

17. The display device of claim 16, wherein the second electrode of the first transistor of each of the first color pixel, and the second color pixel, and the third color pixel is disposed to overlap the scan line to form a gate-drain capacitor, and
wherein a first gate-drain capacitance formed between the scan line and the second electrode of the first transistor of the third color pixel is greater than a second gate-drain capacitance formed between the scan line and the second electrode of the first transistor of each of the first color pixel and the second color pixel.

* * * * *